US012113305B2

(12) United States Patent
Chang et al.

(10) Patent No.: US 12,113,305 B2
(45) Date of Patent: Oct. 8, 2024

(54) METHOD AND APPARATUS AUGMENTING FUNCTIONALITY OF ANTENNA-IN-MODULE OF USER EQUIPMENT TO PROXIMITY DETECTION BESIDES WIRELESS COMMUNICATION

(71) Applicant: MEDIATEK Inc., Hsinchu (TW)

(72) Inventors: Wei-Hsuan Chang, Hsinchu (TW); Cheng-Han Lee, Hsinchu (TW); Chih-Wei Lee, Hsinchu (TW)

(73) Assignee: MEDIATEK Inc., Hsinchu (TW)

( * ) Notice: Subject to any disclaimer, the term of this patent is extended or adjusted under 35 U.S.C. 154(b) by 108 days.

(21) Appl. No.: 18/067,926

(22) Filed: Dec. 19, 2022

(65) Prior Publication Data
US 2024/0204411 A1   Jun. 20, 2024

(51) Int. Cl.
*H01Q 9/04*   (2006.01)
*H04B 5/73*   (2024.01)

(52) U.S. Cl.
CPC ............. *H01Q 9/0428* (2013.01); *H04B 5/73* (2024.01)

(58) Field of Classification Search
None
See application file for complete search history.

(56) References Cited

U.S. PATENT DOCUMENTS

| | | | |
|---|---|---|---|
| 10,483,636 B1 * | 11/2019 | Koto | H04B 17/20 |
| 11,088,453 B1 * | 8/2021 | Coutts | H05K 1/0243 |
| 2013/0163483 A1 * | 6/2013 | Sarraf | H01Q 21/28 |
| | | | 370/277 |
| 2014/0009343 A1 * | 1/2014 | Iellici | H01Q 9/42 |
| | | | 343/700 MS |
| 2015/0123865 A1 * | 5/2015 | Dobric | H01Q 19/005 |
| | | | 343/833 |
| 2017/0181118 A1 * | 6/2017 | Charvat | H04W 4/023 |
| 2019/0252796 A1 * | 8/2019 | Mahanfar | H01Q 21/0025 |
| 2020/0373666 A1 * | 11/2020 | Takaki | H01Q 5/307 |

\* cited by examiner

*Primary Examiner* — Wilson Lee
(74) *Attorney, Agent, or Firm* — McClure, Qualey & Rodack, LLP

(57) ABSTRACT

The invention provides method and apparatus augmenting functionality of an antenna-in-module (AiM) of a user equipment (UE) to proximity detection (and more) besides wireless communication. The AiM may comprise a radiator set and a channel circuit set. The radiator set may comprise one or more radiators, and the channel circuit set may comprise one or more channel circuits. The method may comprise: causing a first subset of the channel circuit set to transmit outgoing electromagnetic (EM) waves by circular polarization of a first rotation sense, causing a second subset of the channel circuit set to receive incoming EM waves by circular polarization of a second rotation sense different from the first rotation sense, accordingly obtaining one or more received detection signals, and executing the proximity detection according to the one or more received detection signals.

20 Claims, 11 Drawing Sheets

METHOD AND APPARATUS AUGMENTING FUNCTIONALITY OF ANTENNA-IN-MODULE OF USER EQUIPMENT TO PROXIMITY DETECTION BESIDES WIRELESS COMMUNICATION

FIELD OF THE INVENTION

The present invention relates to method and apparatus augmenting functionality of an antenna-in-module (AiM) of a user equipment (UE) to proximity detection (and more) besides wireless communication in, e.g., millimeter-wave (mmW); more particularly, to method and apparatus transmitting and receiving outgoing and incoming electromagnetic waves respectively by circular polarization of two different rotation senses, and, according to received detection signal(s) resulting from said transmission and reception, executing the proximity detection and advanced function(s) such as adjusting transmission power of subsequent wireless communication, e.g., lowering transmission power to meet safety regulation(s) of RF exposure if proximity is detected (e.g., human body is approaching).

BACKGROUND OF THE INVENTION

Modern user equipment (UE) comprises one or more antennas for wireless communication. To wirelessly communicate with a remote participant (e.g., a base station, etc.) of wireless network, a UE needs to transmit radiofrequency (RF) electromagnetic (EM) waves. On the other hand, to prevent overexposure of RF radiation, a UE needs to comply with one or more safety regulations which limit power of the EM waves transmitted by the UE. Always transmitting low-power EM waves helps to meet the safety regulations of RF exposure, but degrades performance, such as throughput, of wireless communication.

SUMMARY OF THE INVENTION

An object of the invention is providing a method (e.g., 200 in FIG. 2) augmenting functionality of an antenna-in-module (AiM, e.g., 100 in FIG. 1 or 7) of a UE (e.g., 10 in FIG. 1 or 7) to proximity detection besides wireless communication. The method may be executed by the UE (e.g., a processor of the UE); the AiM may comprise a radiator set (e.g., A0 in FIG. 1 or 7) and a channel circuit set (e.g., S0 in FIG. 1 or 7); the radiator set may include one or more radiators (e.g., a[1] to a[K] or a[1] to a[4] in FIG. 1 or 7), the channel circuit set may include one or more channel circuits (e.g., ch[1] to ch[N] or ch[1] to ch[8] in FIG. 1 or 7), and each said channel circuit may be coupled to an associated said radiator in the radiator set. The method may comprise (e.g., step 304 or 404 in FIG. 3 or 4) causing a first subset (e.g., S1 in FIG. 3, 4 or 7) of the channel circuit set to transmit outgoing EM waves by circular polarization of a first rotation sense; (e.g., step 306 or 406 in FIG. 3 or 4) causing a second subset (e.g., S2 in FIG. 3, 4 or 7) of the channel circuit set to receive incoming EM waves by circular polarization of a second rotation sense, and accordingly obtaining one or more received detection signals (e.g., sd[i2_1] to sd[i2_N2] in FIG. 3 or 4); and (e.g., step 308 or 408 in FIG. 3 or 4) executing the proximity detection according to the one or more received detection signals. The first rotation sense and the second rotation sense may be different (e.g., be opposite, be mutually independent).

In an embodiment (e.g., FIG. 4 or 5), the method may further comprise (e.g., step 412 or 506 in FIG. 4 or 5) causing a third subset (e.g., S3 in FIG. 4, 5 or 7) of the channel circuit set to receive the incoming EM waves by circular polarization of the first rotation sense, and accordingly obtaining one or more received communication signals (e.g., sr[i3_1] to sr[i3_N3] in FIG. 4 or 5); and (e.g., step 414 or 508 in FIG. 4 or 5) retrieving incoming information of the wireless communication from the one or more received communication signals.

In an embodiment (e.g., FIG. 7), the first subset of the channel circuit set may be associated with a first subset (e.g., A1 in FIG. 7) of the radiator set, the third subset of the channel circuit set may be associated with a third subset (e.g., A3 in FIG. 7) of the radiator set, and the third subset of the radiator set may equal the first subset of the radiator set.

In an embodiment (e.g., FIG. 4), when causing the first subset of the channel circuit set to transmit the outgoing EM waves by the circular polarization of the first rotation sense (e.g., at step 404), causing the outgoing EM waves to embed outgoing information of the wireless communication.

In an embodiment (e.g., FIG. 7), the first subset of the channel circuit set may be associated with a first subset (e.g., A1 in FIG. 7) of the radiator set, the second subset of the channel circuit set may be associated with a second subset (e.g., A2 in FIG. 7) of the radiator set, and the first subset of the radiator set may equal the second subset of the radiator set. In an embodiment (e.g., FIG. 7), the first subset (e.g., S1) of the channel circuit set and the second subset (e.g., S2) of the channel circuit set may not be equal.

In an embodiment (e.g., FIG. 3, 4 or 5), the method may further comprise (e.g., step 302, 402 or 502 in FIG. 3, 4 or 5) before causing the first subset of the channel circuit set to transmit the outgoing EM waves by the circular polarization of the first rotation sense (e.g., at step 304, 404 or 504), determining how many channel circuits are included in the first subset of the channel circuit set according to one or more system requirements. In an embodiment, the one or more system requirements may relate to at least one of the following: a signal-to-noise ratio of the proximity detection, and accuracy of the proximity detection.

In an embodiment (e.g., FIG. 3 or 4), the method may further comprise (e.g., step 302 or 402 in FIG. 3 or 4) before causing the second subset of the channel circuit set to receive the incoming EM waves by the circular polarization of the second rotation sense (e.g., at step 306 or 406), determining how many channel circuits are included in the second subset of the channel circuit set according to one or more system requirements. In an embedment, the one or more system requirements may relate to at least one of the following: sensitivity of the proximity detection, and accuracy of the proximity detection.

In an embodiment (e.g., FIG. 3 or 4), the method may further comprise (e.g., step 310 or 410 in FIG. 3 or 4) according to a result of the proximity detection, adjusting transmission power of subsequent wireless communication.

In an embodiment, when adjusting the transmission power of the subsequent wireless communication according to the result of the proximity detection, lowering the transmission power of the subsequent wireless communication if a proximity is detected.

In an embodiment (e.g., FIG. 6a), a certain said radiator (e.g., a[k1] in FIG. 6a) in the radiator set may comprise a first port (e.g., pa[k1]) and a second port (e.g., pb[k1]) respectively associated with linearly polarized resonances of a first direction (e.g., v1) and a second direction (e.g., v2); the first direction and the second direction may not be parallel (e.g., may be perpendicular in an embodiment). A certain said channel circuit (e.g., ch[n1] in FIG. 6) in the first subset of the channel circuit set may comprise an RF frontend circuit (e.g., h[n1]). The RF frontend circuit may comprise an inbound terminal (e.g., i[n1]), a first outbound terminal (e.g., oa[n1]) and a second outbound terminal (e.g., ob[n1]). The first outbound terminal and the second outbound terminal may be coupled to the first port and the second port, respectively. The RF frontend circuit may cause a signal (e.g., ta[n1]) at the first outbound terminal and an outgoing signal (e.g., tc[n1]) at the inbound terminal to have a first phase shift, and may cause a signal (e.g., tb[n1]) at the second outbound terminal and the outgoing signal (e.g., tc[n1]) at the inbound terminal to have a second phase shift, wherein the first phase shift and the second phase shift may be different. When causing the first subset of the channel circuit set to transmit the outgoing EM waves by the circular polarization of the first rotation sense (e.g., at step 304 or 404 in FIG. 3 or 4), the UE (e.g., the processor) may cause the outgoing signal (e.g., tc[n1] in FIG. 6a) to be formed at the inbound terminal.

In an embodiment (e.g., FIG. 6a), a second certain said channel circuit (e.g., ch[n2] in FIG. 6a) in the second subset of the channel circuit set may comprise a second RF frontend circuit (e.g., h[n2]). The second RF frontend circuit may comprise a second inbound terminal (e.g., i[n2]), a third outbound terminal (e.g., oa[n2]) and a fourth outbound terminal (e.g., ob[n2]). The third outbound terminal and the fourth outbound terminal may be coupled to the first port and the second port, respectively. The second RF frontend circuit may cause a signal (e.g., ra[k1]) at the third outbound terminal and a signal (e.g., rc[n2]) at the second inbound terminal to have a third phase shift, and may cause a signal (e.g., rb[k1]) at the fourth outbound terminal and the signal (e.g., rc[n2]) at the second inbound terminal to have a fourth phase shift, wherein the third phase shift and the fourth phase shift may be different. In an embodiment, a difference between the first phase shift and the second phase shift may be different from a difference between the third phase shift and the fourth phase shift. When obtaining the one or more received detection signals (e.g., at step 306 or 406 in FIG. 3 or 4), the UE (e.g., the processor) may obtain one (e.g., sd[n2] in FIG. 6a) of the one or more received detection signals according to the signal (e.g., rc[n2]) at the second inbound terminal.

In an embodiment (e.g., FIG. 6b or 6c), a certain said channel circuit (e.g., ch[n3] or ch[n5] in FIG. 6b or 6c) in the first subset of the channel circuit set may comprise an outbound terminal (e.g., o[n3] or o[n5] in FIG. 6b or 6c), a certain said radiator (e.g., a[k2] or a[k3] in FIG. 6b or 6c) in the radiator set may comprise a first port (e.g., pL[k2] or pL[k3] in FIG. 6b or 6c) and a second port (e.g., pR[k2] or pR[k3] in FIG. 6b or 6c) respectively associated with circularly polarized resonances of the first rotation sense and the second rotation sense, and the outbound terminal may be coupled to the first port. When causing the first subset of the channel circuit set to transmit the outgoing EM waves by the circular polarization of the first rotation sense (e.g., at step 304 or 404 in FIG. 3 or 4), the UE (e.g., the processor) may cause an outgoing signal (e.g., ta[n3] or ta[n5] in FIG. 6b or 6c) to be formed at the outbound terminal.

In an embodiment (e.g., FIG. 6b or 6c), a second certain said channel circuit (e.g., ch[n4] or ch[n6] in FIG. 6b or 6c) in the second subset of the channel circuit set may comprise a second outbound terminal (e.g., o[n4] or o[n6] in FIG. 6b or 6c) coupled to the second port. When obtaining the one or more received detection signals (e.g., at step 306 or 406 in FIG. 3 or 4), the UE (e.g., the processor) may obtain one (e.g., sd[n4] or sd[n6] in FIG. 6b or 6c) of the one or more received detection signals according to a signal (e.g., rb[k2] or rb[k3] in FIG. 6b or 6c) at the second outbound terminal.

In an embodiment (e.g., FIG. 6b), the certain said radiator (e.g., a[k2] in FIG. 6b) may comprise two circular polarization antennas (e.g., aL[k2] and aR[k2]); the first port and the second port (e.g., pL[k2] an pR[k2]) may be coupled to the two circular polarization antennas, respectively.

In an embodiment (e.g., FIG. 6d), a certain said radiator (e.g., a[k4] in FIG. 6d) in the radiator set may comprise a first port and a second port (e.g., pa[k4] and pb[k4] in FIG. 6d) respectively associated with linearly polarized resonances of a first direction and a second direction (e.g., v1 and v2 in FIG. 6d); the first direction and the second direction may not be parallel. The AiM may further comprise a polarizer (e.g., cvr[k4] in FIG. 6d) covering an outward surface of the AiM. A certain said channel circuit (e.g., ch[n7] in FIG. 6d) in the first subset of the channel circuit set may comprise an outbound terminal (e.g., o[n7] in FIG. 6d) coupled to the first port. When causing the first subset of the channel circuit set to transmit the outgoing EM waves by the circular polarization of the first rotation sense (e.g., at step 304 or 404 in FIG. 3 or 4), the UE (e.g., the processor) may cause an outgoing signal (e.g., ta[n7] in FIG. 6d) to be formed at the outbound terminal.

In an embodiment (e.g., FIG. 6d), a second certain said channel circuit (e.g., ch[n8] in FIG. 6d) in the second subset of the channel circuit set may comprise a second outbound terminal (e.g., o[n8]) coupled to the second port. When obtaining the one or more received detection signals (e.g., at step 306 or 406 in FIG. 3 or 4), the UE (e.g., the processor) may obtain one (e.g., sd[n8]) of the one or more received detection signals according to a signal (e.g., rb[k4]) at the second outbound terminal.

An object of the invention is providing an AiM (e.g., 100 in FIG. 1 or 7) of a UE (e.g., 10 in FIG. 1 or 7) with augmented functionality besides wireless communication. The AiM may comprise a radiator set (e.g., A0 in FIG. 1 or 7) and a channel circuit set (e.g., S0 in FIG. 1 or 7). The radiator set may comprise one or more radiators (e.g., a[1] to a[K] or a[1] to a[4] in FIG. 1 or 7). The channel circuit set may comprise one or more channel circuits (e.g., ch[1] to ch[N] or ch[1] to ch[8] in FIG. 1 or 7), each said channel circuit may be coupled to an associated said radiator in the radiator set. The AiM may be arranged to (e.g., step 304 or 404 in FIG. 3 or 4) transmit outgoing EM waves by circular polarization of a first rotation sense, and may be arranged to (e.g., step 306 or 406 in FIG. 3 or 4) receive incoming EM waves by circular polarization of a second rotation sense, and accordingly obtain one or more received detection signals (e.g., sd[i2_1] to sd[i2_N2] in FIG. 3 or 4). The UE (e.g., a processor of the UE) may be arranged to execute a proximity detection (e.g., step 308 or 408 in FIG. 3 or 4) according to the one or more received detection signals. The second rotation sense may be different from the first rotation sense.

In an embodiment (e.g., FIG. 4), the AiM may be further arranged to (e.g., step 412 in FIG. 4) receive incoming EM waves by circular polarization of the first rotation sense, and accordingly obtain one or more received communication signals (e.g., sr[i3_1] to sr[i3_N3] in FIG. 4), and the UE (e.g., the processor) may further be arranged to (e.g., step 414 in FIG. 4) retrieve incoming information of the wireless communication from the one or more received communication signals.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

Figure 1:
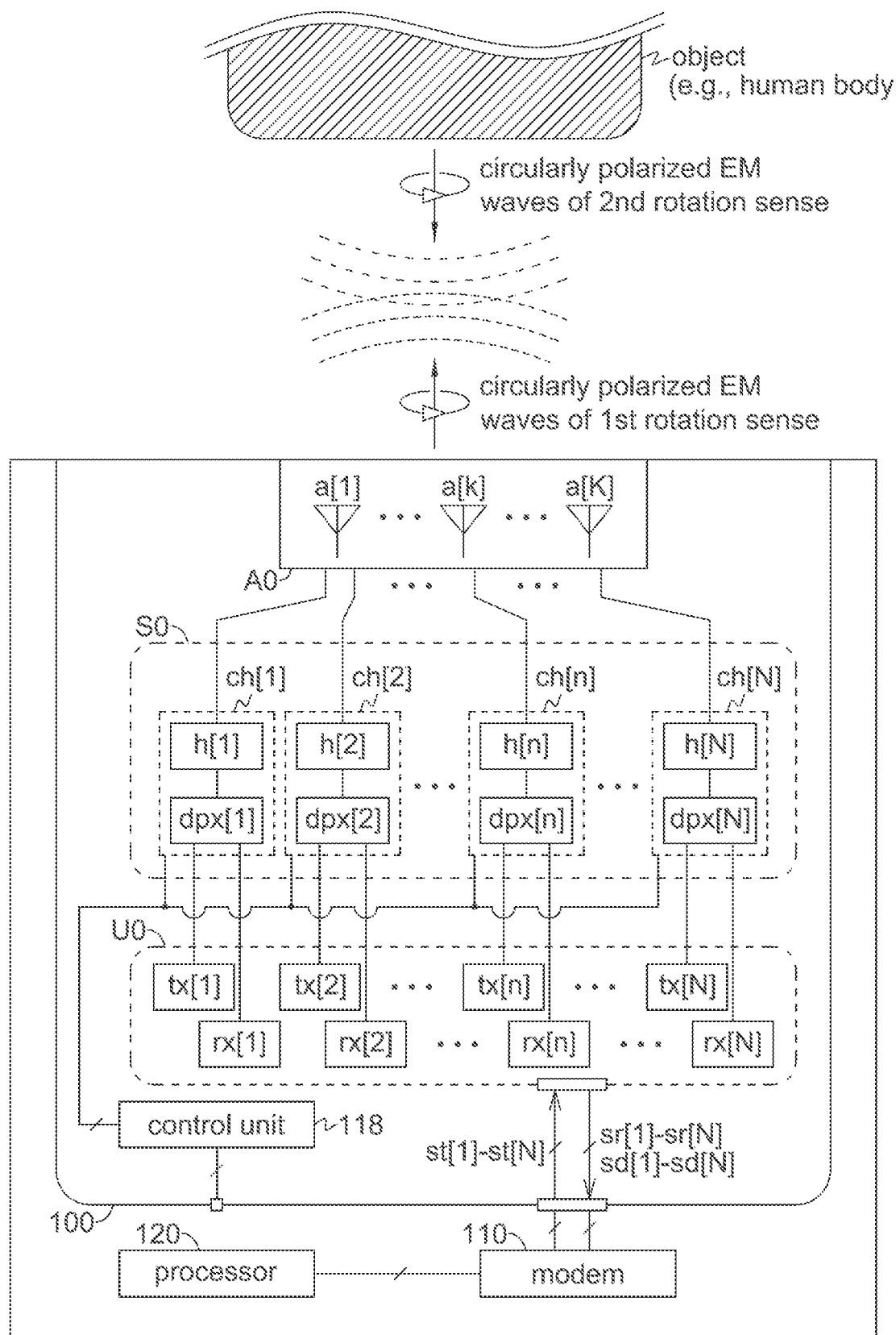
FIG. 1 is a schematic diagram of a UE according to an embodiment of the invention; the UE may include one or more radiators and one or more channel circuits.
Figure 7:
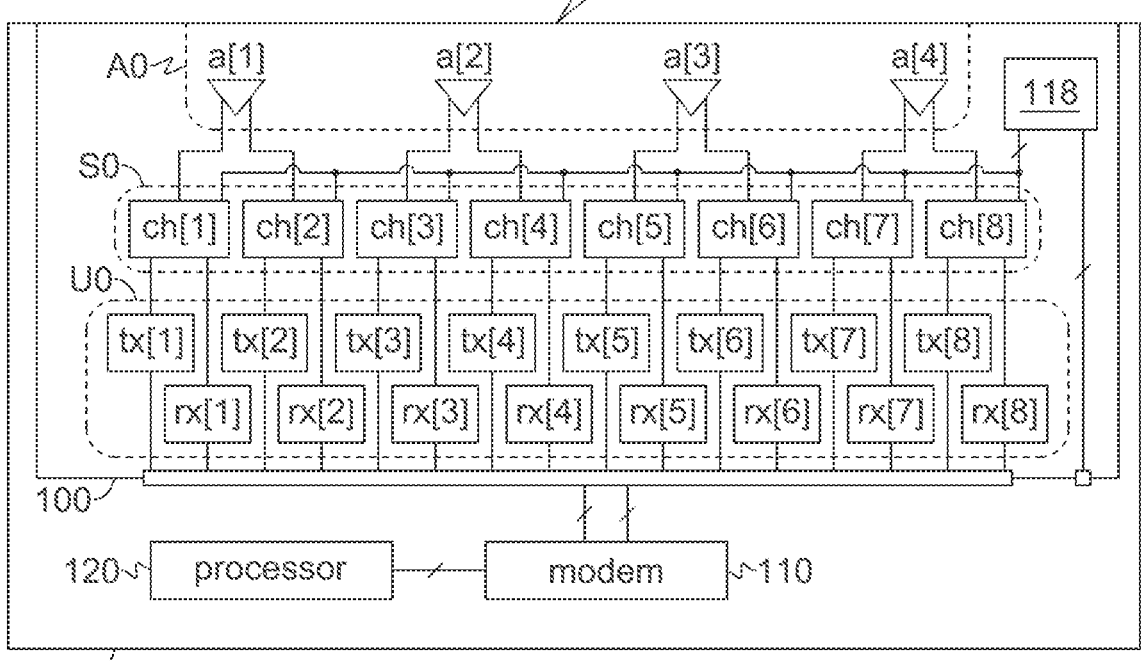

each of FIGS. 6a to 6d schematically depicts an example of the radiator and the associated channel circuits shown in FIG. 1 according to an embodiment of the invention;

FIG. 7 depicts an example of the UE shown in FIG. 1; and

Figure 8:
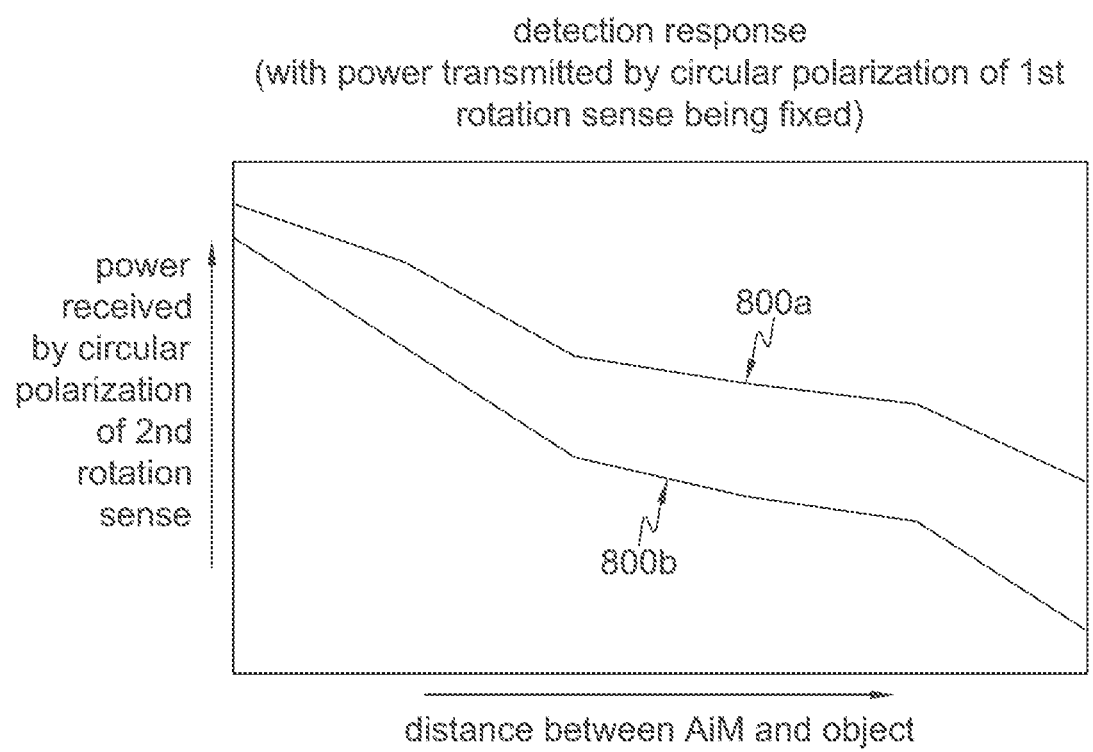

FIG. 8 depicts, according to an example of the invention, responses of proximity detection under different transmission/reception configurations.

DETAILED DESCRIPTION OF PREFERRED EMBODIMENTS

FIG. 1 schematically depicts a diagram of a user equipment (UE) 10 according to an embodiment of the invention. The UE 10 may be a mobile phone, a smart phone, a tablet computer, a notebook computer, a laptop computer, a desktop computer, a wearable gadget (e.g., smart watch, ear phone or glasses, etc.), a drone, a digital camera, a digital camcorder, a set-top box, a smart speaker, a game console, a customer-premises equipment (CPE), a router, an access point, a home appliance (e.g., smart TV, air conditioner, lighting system, refrigerator, washing machine, etc.), an office equipment (e.g., copy machine, printer, audio or video conference system, surveillance system, etc.), an industrial equipment (e.g., assembly line robot), an internet-of-things (IoT) sensor or device, a telematic system, a navigator, or any electronics which implements functionality of wireless communication, e.g., mobile telecommunication adopting network access technology such as long-term evolution (LTE) and/or new radio (NR) defined by third generation partnership project (3GPP).

The UE 10 may comprise an antenna-in-module (AiM) 100, a modulator-demodulator (modem) 110 and a processor 120. The processor 120 may be coupled to the modem 110, and may control operation of the UE 10; for example, the processor 120 may control the modem 110 to implement functionality of wireless communication, e.g., to transmit (or upload) data to one or more remote participants (not depicted) of a wireless network by transmitting EM waves, and/or to receive (or download) data from the remote participant(s) by receiving EM waves. Moreover, according to the invention, the processor 120 may further control the modem 110 to incorporate with the AiM 100 to implement one or more additional functions, such as proximity detection, besides said wireless communication. For example, the AiM 100 (e.g., in corporation with the modem 110) may transmit outgoing EM waves by circular polarization of a first rotation sense, and may receive incoming EM waves by circular polarization of a second rotation sense, so the processor 120 may accordingly obtain one or more received detection signals, and may detect proximity according to the received detection signal(s). The first rotation sense and the second rotation sense may be different (e.g., be opposite); for example, the circular polarization of the first sense may be one of left-hand circular polarization (LHCP) and right-hand circular polarization (RHCP), while the circular polarization of the second sense may be the other one of the LHCP and the RHCP.

As depicted in a top portion of FIG. 1, when the AiM 100 of the UE 10 transmits the outgoing EM wave circularly polarized in the first rotation sense, if an object is near the UE 10, the object will reflect EM waves circularly polarized in the opposite second rotation sense, and the reflected EM waves may form strong incoming EM waves circularly polarized in the second rotation sense to be received as strong received detection signal(s) by the AiM 100 of the UE 10. On the other hand, if the object is far from the UE 10, the reflected EM waves may only form weak incoming EM waves circularly polarized in the second rotation sense to be received as weak received detection signal(s) by the AiM 100 of the UE 10. Hence, the UE 10 (e.g., the processor 120) may determine whether there is nearby object according to strength or power of the received detection signal(s). For example, the UE 10 (e.g., the processor 120) may determine that a proximity is detected if the strength or power of the received detection signal(s) is in a predefined range (e.g., higher than a strength threshold or a power threshold).

Furthermore, the UE 10 (e.g., the process 120) may implement one or more advanced functions according to result(s) of the additional function(s), such as a result of the proximity detection. For example, in an embodiment, the UE 10 (e.g., the processor 120) may dynamically and adaptively determine transmission power of subsequent wireless communication according to the result of the proximity detection. In an embodiment, when proximity is detected, the UE 10 (e.g., the processor 120) may lower transmission power of subsequent wireless communication, e.g., may set transmission power of subsequent wireless communication to a lower power level. Because proximity may indicate that human body (e.g., user) is near the UE 10, wirelessly communicating by lower transmission power may ensure compliance to the safety regulations of RF exposure.

On the other hand, when proximity is not detected, the UE 10 (e.g., the processor 120) may raise transmission power of subsequent wireless communication, e.g., may set transmission power of subsequent wireless communication to a higher power level. Because absence of proximity may indicate that there is no human body near the UE 10, wirelessly communicating by higher transmission power may improve performance, e.g., throughput, of wireless communication. By dynamically and adaptively determining and adjusting transmission power of wireless communication, the UE 10 according to the invention may improve performance of wireless communication without failing the safety regulations of RF exposure.

As shown in FIG. 1, the AiM 100 may comprise a radiator set A0, a channel circuit set S0, an inner circuit set U0 and a control unit 118. The radiator set A0 may comprise one or more radiators a[1] to a[K], with index K being a predefined integer greater than or equal to one. In an embodiment, each of the radiators a[1] to a[K] may resonate to transmit and/or receive EM waves in millimeter-wave (mmW). The channel circuit set S0 may comprise one or more channel circuits ch[1] to ch[N], with index N being a predefined integer greater than or equal to one. The indices K and N may be different or equal. The inner circuit set U0 may comprise one or more transmission circuits tx[1] to tx[N], and one or more reception circuits rx[1] to rx[N]. Though not depicted for conciseness, the UE 10 may further comprise other circuit(s), hardware(s), sensor(s) and/or peripheral(s), such as one or more memories, power management circuit, graphic processor(s), signal processor(s), microphone(s), speaker(s), camera(s), touch sensor(s), display panel(s), etc.

In the AiM 100, the control unit 118 may be coupled to the channel circuits ch[1] to ch[N], and may control operations of the channel circuits ch[1] to ch[N] according to instruction of the processor 120. Each channel circuit ch[n], for index n=1 to N, may be coupled to an associated radiator a[k], for index k being one of 1 to K. On the other hand, each radiator a[k] may be coupled to, and may therefore be associated with, one or more of the channel circuits ch1[1] to ch[N]. Each channel circuit ch[n] may comprise an RF frontend circuit h[n] and a duplexer dpx[n]; the RF frontend circuit h[n] may be coupled between the associated radiator a[k] and the duplexer dpx[n], and the duplexer dpx[n] may be coupled between the RF frontend circuit h[n], the associated transmission circuit tx[n] and the associated reception circuit rx[n], for index=1 to N. Each duplexer dpx[n] may allow the transmission circuit tx[n] and the reception rx[n] to share the RF frontend circuit h[n]. Each transmission circuit tx[n] may comprise a power amplifier (PA, not depicted for conciseness); the PA may amplify a signal input from the modem 110, and may output the amplified signal to the duplexer dpx[n]. Each reception circuit rx[n] may comprise a low-noise amplifier (LNA, not depicted for conciseness); the LNA may amplify a signal input from the duplexer dpx[n], and may output the amplified signal to the modem 110. The channel circuit ch[n], the associated transmission circuit tx[n] and the reception circuit rx[n] may jointly function as one multi-input multi-output (MIMO) channel.

Figure 2:
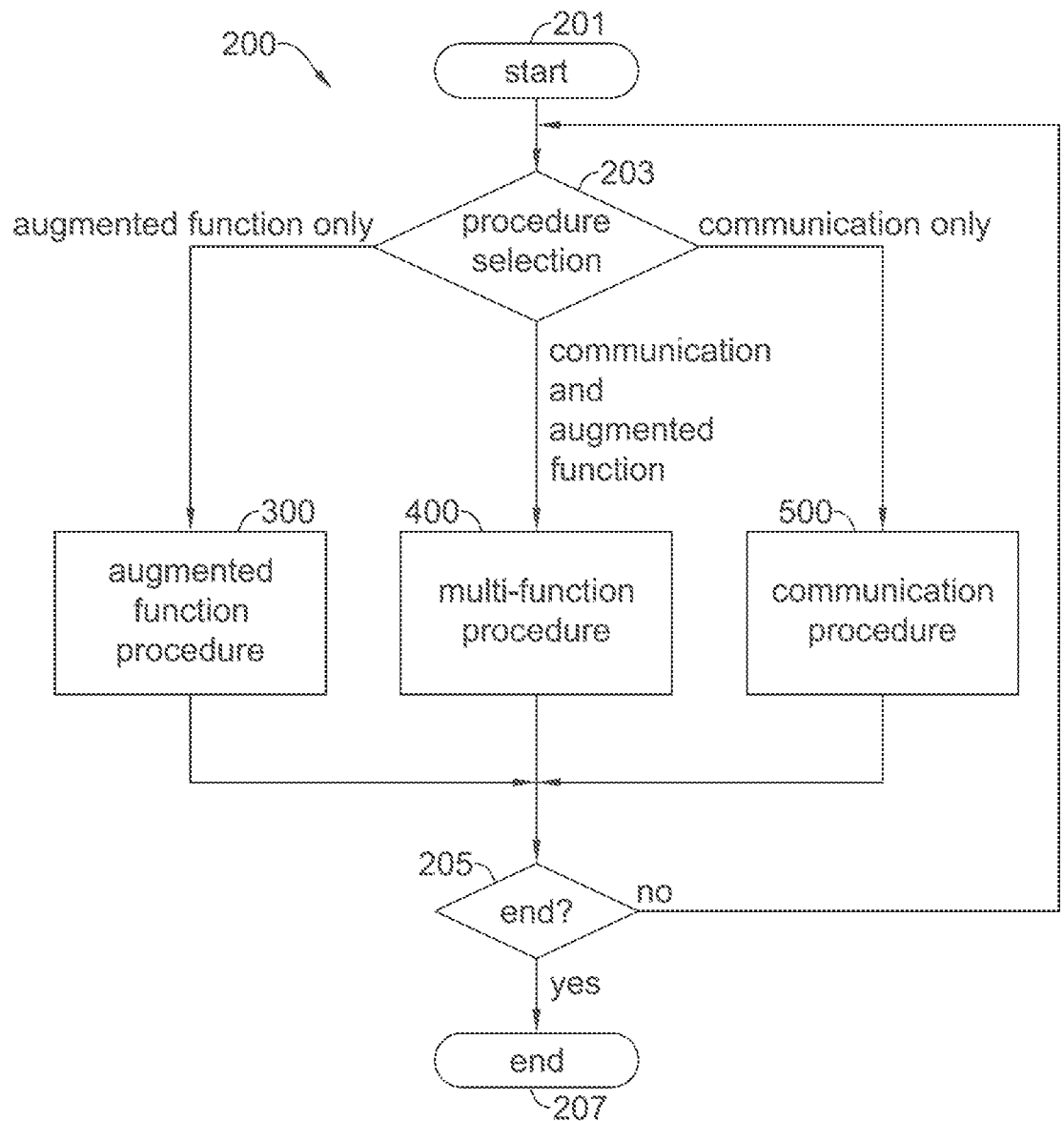
FIG. 2 depicts a flowchart according to an embodiment of the invention; the flowchart may comprise an augmented function procedure, a multi-function procedure and a communication procedure.

FIG. 2 depicts a flowchart 200 according to an embodiment of the invention. The UE 10 (e.g., the processor 120) in FIG. 1 may adopt the flowchart 200 to control the modem 110, and may therefore augment functionality of the AiM 100 to additional function(s) besides wireless communication. Steps of the flowchart 200 may be described as follows.

Step 201: the UE 10 (e.g., the processor 120) may start the flowchart 200. For example, the UE 10 may start the flowchart 200 when the UE 10 boots, reboots, is paged, exits an idle state during which the UE 10 does not transmit to reduce power consumption, and/or when amount of data to be transmitted is higher than a data threshold, etc.

Step 203: the UE 10 (e.g., the processor 120) may select one of multiple procedures to proceed to. As shown in FIG. 2, in an embodiment, the multiple procedures may include procedures 300, 400 and 500. In an embodiment, the procedure 300 may only implement augmented function(s), including additional function(s) and advanced function(s), such as proximity detection and dynamic transmission power adjustment. The procedure 400 may implement wireless communication along with the augmented function(s), and the procedure 500 may only implement wireless communication. The procedures 300, 400 and 500 may respectively be referred to as an augmented function procedure, a multi-function procedure and a communication procedure.

In another embodiment not depicted for conciseness, the multiple procedures to be selected at step 203 may only include the procedures 300 and 500. In yet another embodiment not depicted for conciseness, the multiple procedures may only include the procedures 300 and 400. In still another embodiment not depicted for conciseness, the multiple procedures may only include the procedures 400 and 500.

The UE 10 (e.g., the processor 120) may determine which procedure to select according to various factors. For example, if the UE 10 is a mobile phone and is paged for data transfer, the UE 10 may select the procedure 400, since user may possibly be close to or far from the UE 10 during the data transfer. For another example, if the UE 10 is a CPE for wireless data interconnection, the UE 10 may select the procedure 400. Also, the UE 10 may determine which procedure to select according to setting of user; for example, if the UE 10 is a CPE in an office, user may schedule the UE 10 to select different procedures during different times. The UE 10 may also determine which procedure to select by machine learning, etc.

Procedure 300: the UE 10 (e.g., the processor 120) may execute steps which will be described later by referring to FIG. 3, and may return to step 205 after the procedure 300.

Procedure 400: the UE 10 (e.g., the processor 120) may execute steps which will be described later by referring to FIG. 4, and may return to step 205 after the procedure 300.

Procedure 500: the UE 10 (e.g., the processor 120) may execute steps which will be described later by referring to FIG. 5, and may return to step 205 after the procedure 500.

Step 205 (FIG. 2): the UE 10 (e.g., the processor 120) may determine whether to end the flowchart 200, may proceed to step 207 if determining to end the flowchart 200, and may iterate step 203 if determining not to end the flowchart 200. For example, if the UE 10 is going to be powered off or is going to reboot, the UE 10 may determine to end the flowchart 200, and may proceed to step 207. Otherwise, if the UE 10 remains on, the UE 10 may determine not to end the flowchart 200, and may iterate step 203.

Figure 3:
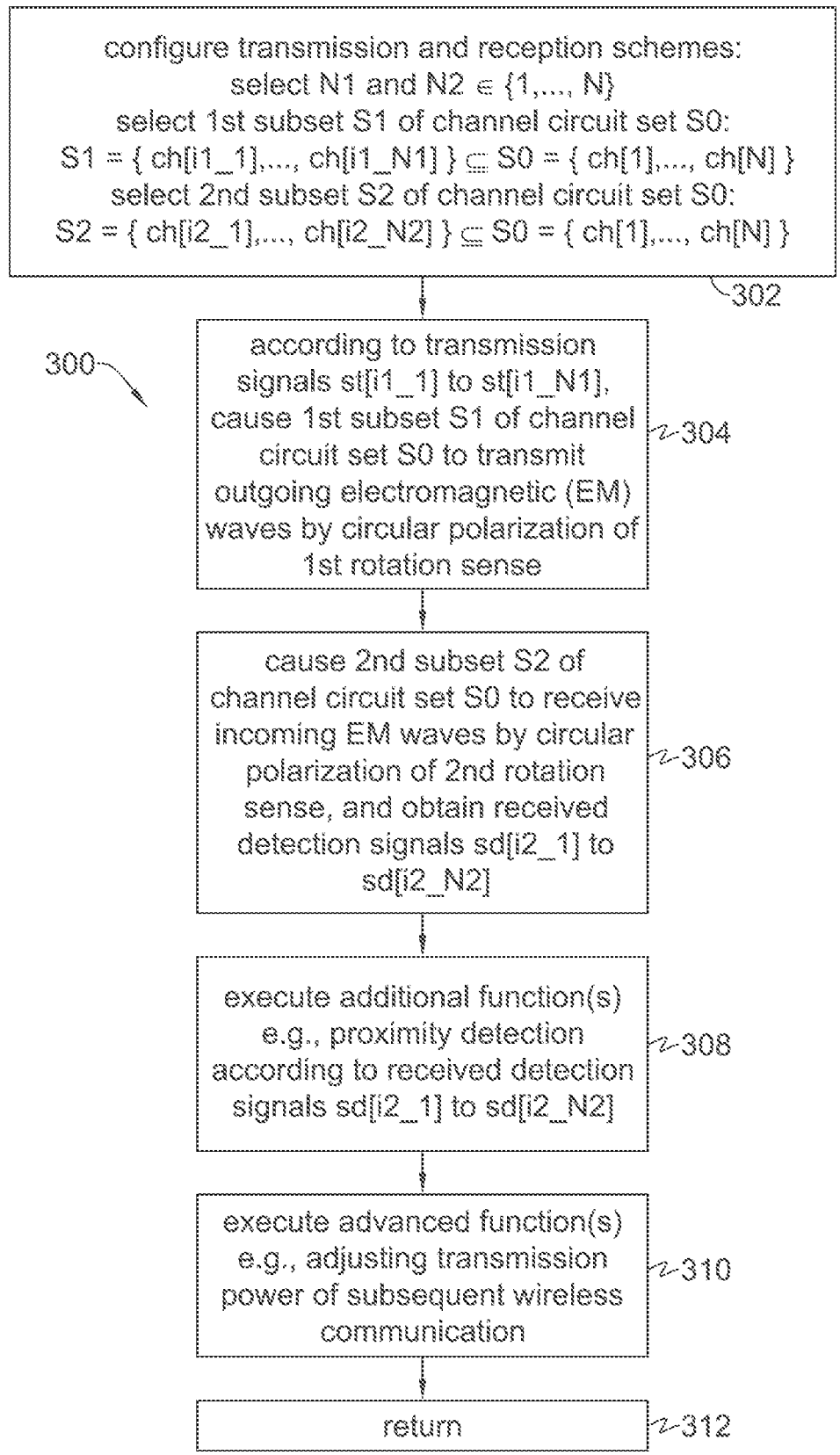
FIGS. 3 to 5 depict the augmented function procedure, the multi-function procedure and the communication procedure respectively.

FIG. 3 depicts steps of the augmented function procedure 300 shown in FIG. 2. By adopting the procedure 300, the processor 120 may cooperate with the modem 110 and the AiM 100 to implement augmented function(s), such as proximity detection and adaptive setting of transmission power of wireless communication. For convenience of understanding, it is assumed that the augmented function(s) includes proximity detection. By referring to FIG. 3, steps of the procedure 300 may be described as follows.

Step 302: the UE 10 (e.g., the processor 120) may configure transmission and reception schemes according to one or more system requirements. In an embodiment, according to a first subset of the system requirement(s), the UE 10 may determine how many channel circuits and which channel circuit(s) should be included in a first subset S1 of the channel circuit set S0 (FIG. 1), wherein the first subset of the system requirement(s) may relate to performance and/or quality of the augmented function(s), e.g., may relate to a signal-to-noise ratio and/or accuracy of proximity detection, etc. For example, according to the first subset of the system requirement(s), the UE 10 may select an integer N1 from 1 to N, may then select one or more channel circuits ch[i1_1] to ch[i1_N1] from the channel circuits ch[i] to ch[N] included in the channel circuit set S0 (with indices i1_1 to i1_N1 being different ones of 1 to N if N1>1), and may include the one or more channel circuits ch[i1_i] to ch[i1_N1] in the first subset S1 of the channel circuit set S0. The channel circuits ch[i1_i] to ch[i1_N1] in the first subset S1 of the channel circuit set S0 may be associated with one or more radiators a[j1_1] to a[j1_K1] included in the radiator set A0, with indices j1_1 to j1_K1 being different ones of 1 to K if K1>1; the radiators a[j1_1] to a[j1_K1] may form a first subset A1 of the radiator set A0. The channel circuits ch[i1_1] to ch[i1_N1] in the first subset S1 of the channel circuit set S0 may be associated with one or more transmission circuits tx[i1_1] to tx[i1_N1] included in the inner circuit set U0. For example, in an embodiment, if the first subset of the system requirement(s) demands better signal-to-noise ratio of proximity detection and/or higher accuracy of the proximity detection, the UE 10 may select an integer close to or equal to the index N as the integer N1 to include more or all of the channel circuits ch[i] to ch[N] in the first subset S1 of the channel circuit set S0.

Also, according to a second subset of the system requirement(s), the UE 10 may determine how many channel circuits and which channel circuit(s) should be included in a second subset S2 of the channel circuit set S0, wherein the second subset of the system requirement(s) may relate to performance and/or quality of the augmented function(s), e.g., may relate to sensitivity and/or accuracy of proximity detection, etc. For example, according to the second subset of the system requirement(s), the UE 10 may select an integer N2 from 1 to N, may then select one or more channel circuits ch[i2_1] to ch[i2_N2] from the channel circuits ch[1] to ch[N] included in the channel circuit set S0 (with indices i2_1 to i2_N2 being different ones of 1 to N if N2>1), and may include the one or more channel circuits ch[i2_1] to ch[i2_N2] in the second subset S2 of the channel circuit set S0. The channel circuits ch[i2_1] to ch[i2_N2] in the second subset S2 of the channel circuit set S0 may be associated with one or more radiators a[j2_1] to a[j2_K2] included in the radiator set A0, with indices j2_1 to j1_K2 being different ones of 1 to K if K2>1; the one or more radiators a[j2_1] to a[j2_K2] may form a second subset A2 of the radiator set A0. The channel circuits ch[i2_1] to ch[i2_N2] in the second subset S2 of the channel circuit set S0 may be associated with one or more reception circuits rx[i2_1] to rx[i2_N2] included in the inner circuit set U0. For example, in an embodiment, if the second subset of the system requirement(s) demands better signal-to-noise ratio and/or higher accuracy of proximity detection, the UE 10 may select an integer close to or equal to the index N as the integer N2 to include more or all of the channel circuits ch[1] to ch[N] in the second subset S2 of the channel circuit set S0. The integers N1 and N2 may be equal or different. In an embodiment, the first subset A1 of the radiator set A0 may equal the second subset A2 of the radiator set A0.

Step 304: the UE 10 (e.g., the processor 120) may cause the one or more transmission circuits tx[i1_1] to tx[i1_N1], the one or more channel circuits ch[i1_1] to ch[i1_N1] included in the first subset S1 of the channel circuit set S0, and the associated one or more radiators a[j1_1] to a[j1_K1] in the AiM 100 to transmit outgoing EM waves by circular polarization of the first rotation sense. For example, the UE 10 (e.g., the processor 120) may cause the modem 110 to form one or more transmission signals st[i1_1] to st[i1_N1] output to the one or more transmission circuits tx[i1_1] to tx[i1_N1], so the one or more radiators a[j1_1] to a[j1_K1] may be fed via the one or more transmission circuits tx[i1_1] to tx[i1_N1] and the associated one or more channel circuits ch[i1_1] to ch[i1_N1] according to the one or more signals st[i1_i] to st[i1_N1]. Since the procedure 300 may only need to implement the augmented function(s) without implementing wireless communication, the processor 120 may cause the signals st[i1_1] to st[i1_N1] not to be confused with signal(s) of wireless communication; e.g., may arrange the signals st[i1_1] to st[i1_N1] not to follow protocol(s) of the wireless communication, so the resultant outgoing EM waves transmitted at step 304 may not be identified as EM waves of the wireless communication if received by remote participant(s). For example, frequency band(s) of the signals st[i1_1] to st[i1_N1] may not overlap frequency band(s) utilized by the wireless communication; and/or, coding, modulation and/or formatting of the signals st[i1_1] to st[i1_N1] may not be the same as coding, modulation and/or formatting utilized by the wireless communication. In an embodiment, each of the signals st[i1_1] to st[i1_N1] may be a pulse signal, a single-tone signal, or a frequency modulated continuous wave (FMCW) signal, etc.

Step 306: in respond to transmitting of the outgoing EM waves at step 304, the UE 10 (e.g., the processor 120) may cause the radiators a[j2_1] to a[j2_K2], the one or more channel circuits ch[i2_1] to ch[i2_N2] included in the second subset S2 of the channel circuit set S0, and the associated one or more reception circuits rx[i2_1] to rx[i2_N2] to receive incoming EM waves by circular polarization of the second rotation sense, and to accordingly form one or more received detection signals sd[i2_1] to sd[i2_N2] output from the one or more reception circuits rx[i2_1] to rx[i2_N2] to the modem 110. The UE 10 (e.g., the processor 120) may therefore obtain the one or more received detection signals sd[i2_1] to sd[i2_N2].

Step 308: the UE 10 (e.g., the processor 120) may execute one or more additional functions according to the one or more received detection signals sd[i2_1] to sd[i2_N2], e.g., the UE 10 may execute proximity detection according to the one or more received detection signals sd[i2_1] to sd[i2_N2]. For example, in an embodiment, the UE 10 (e.g., the processor 120) may determine whether proximity is detected according to whether power (or strength) of the signals sd[i2_1] to sd[i2_N2] is higher than a power threshold (or a strength threshold). In an embodiment, the proximity detection may include a distance estimation; for example, based on a known power-distance relation (or power-distance lookup table), the processor 120 may calculate (or find) an object distance between object and the AiM 100 (or the UE 10) according to power of the signals sd[i2_1] to sd[i2_N2], then the processor 120 may determine whether proximity is detected according to whether the estimated object distance is shorter than a distance threshold.

The one or more additional functions which the UE 10 may execute according to the received detection signals sd[i2_1] to sd[i2_N2] may also include object identification, face recognition, gesture sensing, movement detection and/or obstacle detection, etc.

Step 310: the UE 10 (e.g., the processor 120) may execute one or more advanced functions according to result(s) of the additional function(s) executed at step 308; e.g., the UE 10 may adjust transmission power of subsequent wireless communication according to result of the proximity detection executed at step 308. For example, according to whether proximity is detected, the processor 120 may control whether the one or more transmission circuits tx[1] to tx[N] in the inner circuit set U0 should apply a lower power or a higher power for transmission of subsequent wireless communication. In an embodiment, the processor 120 may repeat steps 304, 306 and 308 more than once to accumulate more than one results of the additional function(s), and may execute the advanced function(s) according to statistics (e.g., majority) of the accumulated results; e.g., the processor 120 may determine transmission power of subsequent wireless communication according to majority of accumulated results of proximity detection.

The one or more advanced functions which the UE 10 may execute at step 310 according to result(s) of the additional function(s) executed at step 308 may also include: causing the processor 120 to transit from a sleep mode to a wake mode if proximity is detected, turning on a security camcorder (not depicted) according to whether proximity is detected, etc.

Step 312: the UE 10 may end the procedure 300 and return to step 205 (FIG. 2).

Figure 4:
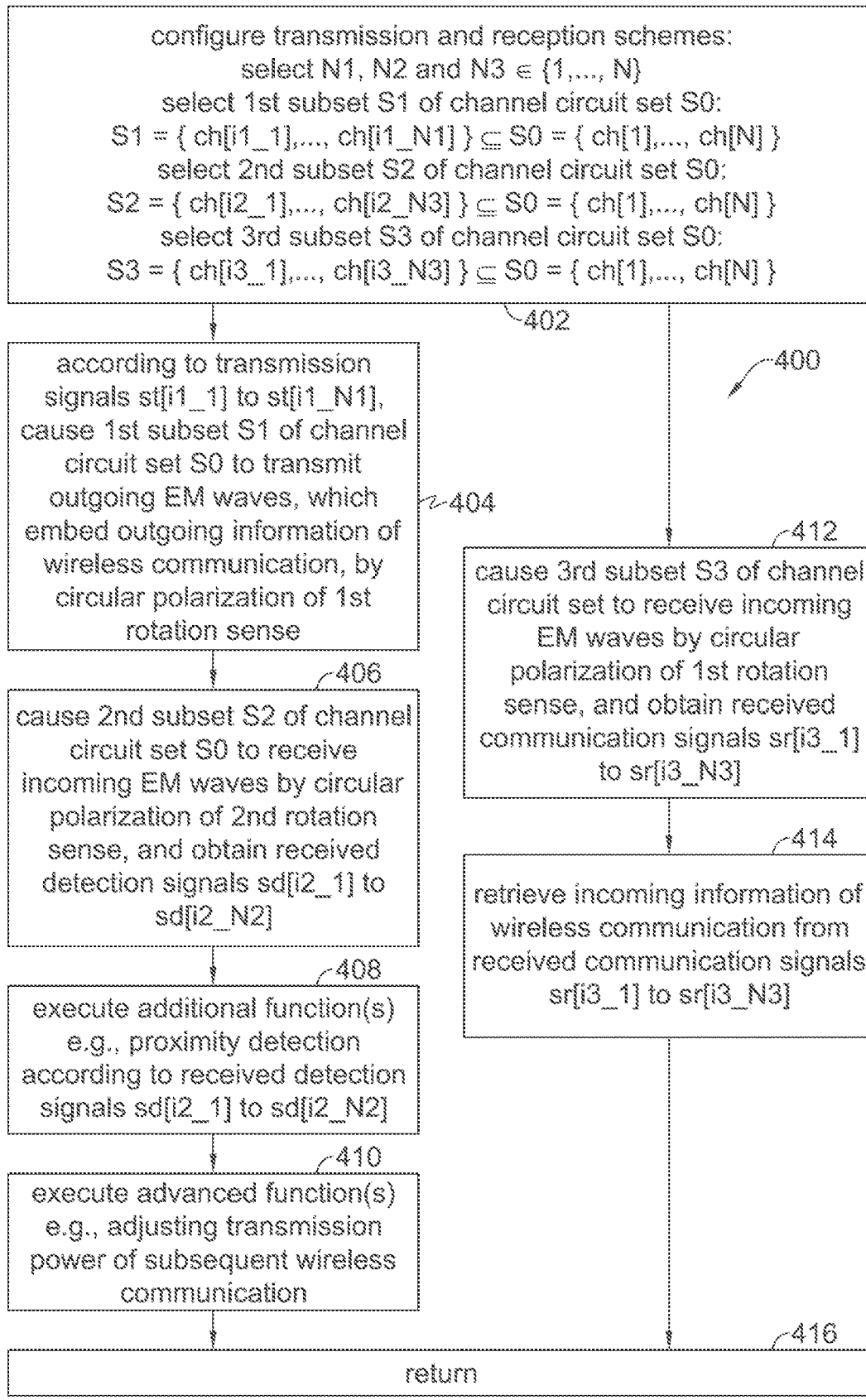

FIG. 4 depicts steps of the multi-function procedure 400 shown in FIG. 2. By adopting the procedure 400, the processor 120 may cooperate with the modem 110 and the AiM 100 to implement wireless communication and augmented function(s), such as proximity detection and adaptive setting of transmission power of wireless communication. For convenience of understanding, it is assumed that the augmented function(s) includes proximity detection. By referring to FIG. 4, steps of the procedure 400 may be described as follows.

Step 402: the UE 10 (e.g., the processor 120) may configure transmission and reception schemes according to one or more system requirements. For example, according to a first subset of the system requirement(s), the UE 10 may determine an integer N1 indicating how many channel circuits should be included in a first subset S1 of the channel circuit set S0, wherein the first subset of the system requirement(s) may relate to performance and/or quality of the augmented function(s), and may relate to performance and/or quality of wireless communication; e.g., the first subset of the system requirement(s) may relate to transmission demands of wireless communication, signal-to-noise ratio of proximity detection, and/or accuracy of proximity detection, etc. Also, according to a second subset of the system requirement(s), the UE 10 may determine an integer N2 indicating how many channel circuits should be included in a second subset S2 of the channel circuit set S0, wherein the second subset of the system requirement(s) may relate to performance and/or quality of the augmented function(s), e.g., may relate to sensitivity of the proximity detection and/or accuracy of the proximity detection, etc. In addition, according to a third subset of the system requirement(s), the UE 10 may determine an integer N3 indicating how many channel circuits should be included in a third subset S3 of the channel circuit set S0, wherein the third subset of the system requirement(s) may relate to performance and/or quality of wireless communication, e.g., may relate to reception demands of wireless communication, etc. The integer N1 may be equal to or different from the integer N2, the integer N2 may be equal to or different from the integer N3, and the integer N3 may be equal to or different from the integer N1. When determining the integers N1 to N3, the UE 10 may select each of the integers N1, N2 and N3 from 1 to N. For example, when determining the integer N3, the UE 10 may set the integer N3 close to or equal to the index N to include more or all of the channel circuit ch[1] to ch[N] in the third subset S3 of the channel circuit set S0 if the third subset of the system requirement(s) demands high reception quality of wireless communication.

From the channel circuits ch[i] to ch[N] in the channel circuit set S0, the UE 10 may then select one or more channel circuits ch[i1_1] to ch[i1_N1](for indices i1_1 to i1_N1 being different ones of 1 to N if N1>1) to be included in the first subset S1 of the channel circuit set S0, may select one or more channel circuits ch[i2_1] to ch[i2_N2] (for indices i2_1 to i2_N2 being different ones of 1 to N if N2>1) to be included in the second subset S2 of the channel circuit set S0, and may select one or more channel circuits ch[i3_1] to ch[i3_N3](for indices i3_1 to i3_N3 being different ones of 1 to N if N3>1) to be included in the third subset S3 of the channel circuit set S0.

The one or more channel circuits ch[i1_1] to ch[i1_N1] in the first subset S1 of the channel circuit set S0 may be associated with one or more radiators a[j1_1] to a[j1_K1] included in the radiator set A0, with indices j1_1 to j1_K1 being different ones of 1 to K if K1>1; the one or more radiators a[j1_1] to a[j1_K1] may form a first subset A1 of the radiator set A0. The one or more channel circuits ch[i1_1] to ch[i1_N1] may also be associated with one or more transmission circuits tx[i1_1] to tx[i1_N1] included in the inner circuit set U0. The one or more channel circuits ch[i2_1] to ch[i2_N2] in the second subset S2 of the channel circuit set S0 may be associated with one or more radiators a[j2_1] to a[j2_K2] included in the radiator set A0, with indices j2_1 to j2_K2 being different ones of 1 to K if K2>1; the one or more radiators a[j2_1] to a[j2_K2] may form a second subset A2 of the radiator set A0. The one or more channel circuits ch[i2_1] to ch[i2_N2] may also be associated with one or more reception circuits rx[i2_1] to rx[i2_N2] included in the inner circuit set U0. The one or more channel circuits ch[i3_1] to ch[i3_N3] in the third subset S3 of the channel circuit set S0 may be associated with one or more radiators a[j3_1] to a[j3_K3] included in the radiator set A0, with indices j3_1 to j3_K3 being different ones of 1 to K if K3>1; the one or more radiators a[j3_1] to a[j3_K3] may form a third subset A3 of the radiator set A0. The one or more channel circuits ch[i3_1] to ch[i3_N3] may also be associated with one or more reception circuits rx[i3_1] to rx[i3_N3] included in the inner circuit set U0. In an embodiment, third subset A3 of the radiator set A0 may equal the first subset A1 of the radiator set A0.

Step 404: the UE 10 (e.g., the processor 120) may cause the one or more transmission circuits tx[i1_1] to tx[i1_N1], the one or more channel circuits ch[i1_1] to ch[i1_N1] included in the first subset S1 of the channel circuit set S0, and the associated one or more radiators a[j1_1] to a[j1_K1] in the AiM 100 to transmit outgoing EM waves by circular polarization of the first rotation sense. For example, the UE 10 (e.g., the processor 120) may cause the modem 110 to form one or more transmission signals st[i1_1] to st[i1_N1] output to the one or more transmission circuits tx[i1_1] to tx[i1_N1], so the one or more radiators a[j1_1] to a[j1_K1] may be fed via the one or more transmission circuits tx[i1_1] to tx[i1_N1] and the one or more channel circuits ch[i1_i] to ch[i1_N1] according to the one or more signals st[i1_1] to st[i1_N1]. Since the procedure 400 may implement wireless communication besides the augmented function(s), the processor 120 may cause the signals st[i1_1] to st[i1_N1] to embed outgoing information (e.g., symbols, messages, data, contents and/or streams, etc.) of the wireless communication according to protocol(s) of the wireless communication, so the resultant outgoing EM waves transmitted at step 404 may be identified as EM waves of the wireless communication when received by remote participant(s). For example, the signals st[i1_1] to st[i1_N1] may be arranged to utilize frequency band(s), time duration(s) and/or radio resources allocated for transmission of the wireless communication, and may be coded, modulated and/or formatted following protocol(s) of the wireless communication.

Step 406: in respond to transmitting of the outgoing EM waves at step 404, the UE 10 may cause the radiators a[j2_1] to a[j2_K2], the one or more channel circuits ch[i2_1] to ch[i2_N2] included in the second subset S2 of the channel circuit set S0, and the associated one or more reception circuits rx[i2_1] to rx[i2_N2] to receive incoming EM waves by circular polarization of the second rotation sense, and to accordingly form one or more received detection signals sd[i2_1] to sd[i2_N2] output from the one or more reception circuits rx[i2_1] to rx[i2_N2] to the modem 110. The UE 10 may therefore obtain the one or more received detection signals sd[i2_1] to sd[i2_N2].

Step 408: similar to step 308 (FIG. 3), the UE 10 (e.g., the processor 120) may execute one or more additional functions according to the one or more received detection signals sd[i2_1] to sd[i2_N2], e.g., the UE 10 may execute proximity detection according to the one or more received detection signals sd[i2_1] to sd[i2_N2]. In an embodiment, the UE 10 may determine whether proximity is detected according to whether power (or strength) of the one or more signals sd[i2_1] to sd[i2_N2] is higher than a power threshold (or a strength threshold). And/or, the UE 10 may calculate an object distance between object and the AiM 100 (or the UE 10) by mapping power of the signals sd[i2_1] to sd[i2_N2] to a known power-distance relation, and may determine whether proximity is detected according to whether the estimated object distance is shorter than a distance threshold.

Step 410: similar to step 310 (FIG. 3), the UE 10 (e.g., the processor 120) may execute one or more advanced functions according to result(s) of the additional function(s) executed at step 408, e.g., the UE 10 may determine transmission power of subsequent wireless communication according to result of the proximity detection executed at step 408.

Step 412: the UE 10 (e.g., the processor 120) may cause the radiators a[j3_1] to a[j3_K3] included in the third subset of the radiator set A0, the one or more channel circuits ch[i3_1] to ch[i3_N3] included in the third subset S3 of the channel circuit set S0, and the associated one or more reception circuits rx[i3_1] to rx[i3_N3] to receive incoming EM waves by circular polarization of the first rotation sense, and to accordingly form one or more received communication signals sr[i3_1] to sr[i3_N3] output from the one or more reception circuits rx[i3_1] to rx[i3_N3] to the modem 110. The UE 10 may therefore obtain the one or more received communication signals sr[i3_1] to sr[i3_N3].

Step 414: according to protocol(s) of the wireless communication, the UE 10 (e.g., the processor 120) may retrieve incoming information of the wireless communication from the one or more received communication signals sr[i3_1] to sr[i3_N3] by, e.g., demodulation and/or decoding, etc.

Step 416: the UE 10 (e.g., the processor 120) may end the procedure 400 and return to step 205 (FIG. 2).

In the procedure 400 (FIG. 4), transmitting outgoing EM waves by circular polarization of the first rotation sense at step 404 may not only embed communication information to work for wireless communication, but also implement probing waves to work for the additional function(s) such as the proximity detection. Receiving incoming EM waves by circular polarization of the second rotation sense at step 406 may collect data (e.g., the one or more signals sd[i2_1] to sd[i2_N2]) for the additional function(s) such as proximity detection, because EM waves reflected from object in response to the outgoing EM waves transmitted at step 404 will be circularly polarized in the second rotation sense opposite to the first rotation sense. On the other hand, receiving incoming EM waves by circular polarization of the first rotation sense at step 412 may distinguish EM waves transmitted by remote participant(s) of wireless network and EM waves reflected from object in response to the outgoing EM waves transmitted at step 404, since the EM waves reflected from object in response to the EM waves transmitted at step 404 will be circularly polarized in the second rotation sense independent of the first rotation sense. By excluding EM waves circularly polarized in the second rotation sense at step 412, the UE 10 (e.g., the processor 120) at step 414 may correctly retrieve communication information from the EM waves actually transmitted by the remote participant(s) of the wireless network. Hence, by adopting the procedure 400, the UE 10 may execute additional function(s) such as proximity detection during wireless communication.

Because circular polarization may be decomposed to linear polarization of two different directions, the circularly polarized outgoing EM waves transmitted at step 404 may be received by the remote participant(s) even if the remote participant(s) can only receive linearly polarized EM waves. Also, linearly polarized EM waves transmitted from the remote participant(s) may be received at step 412 even though the EM waves are received by circular polarization at step 412.

When running the procedure 400, the UE 10 (e.g., the processor 120) may execute step 404 (and subsequent steps 406, 408 and 410) before executing step 412, after executing step 412 and/or concurrently when executing step 412; for example, the UE 10 may execute steps 404 and 412 according to a communication schedule negotiated with the remote participant(s) of the wireless network.

Figure 5:
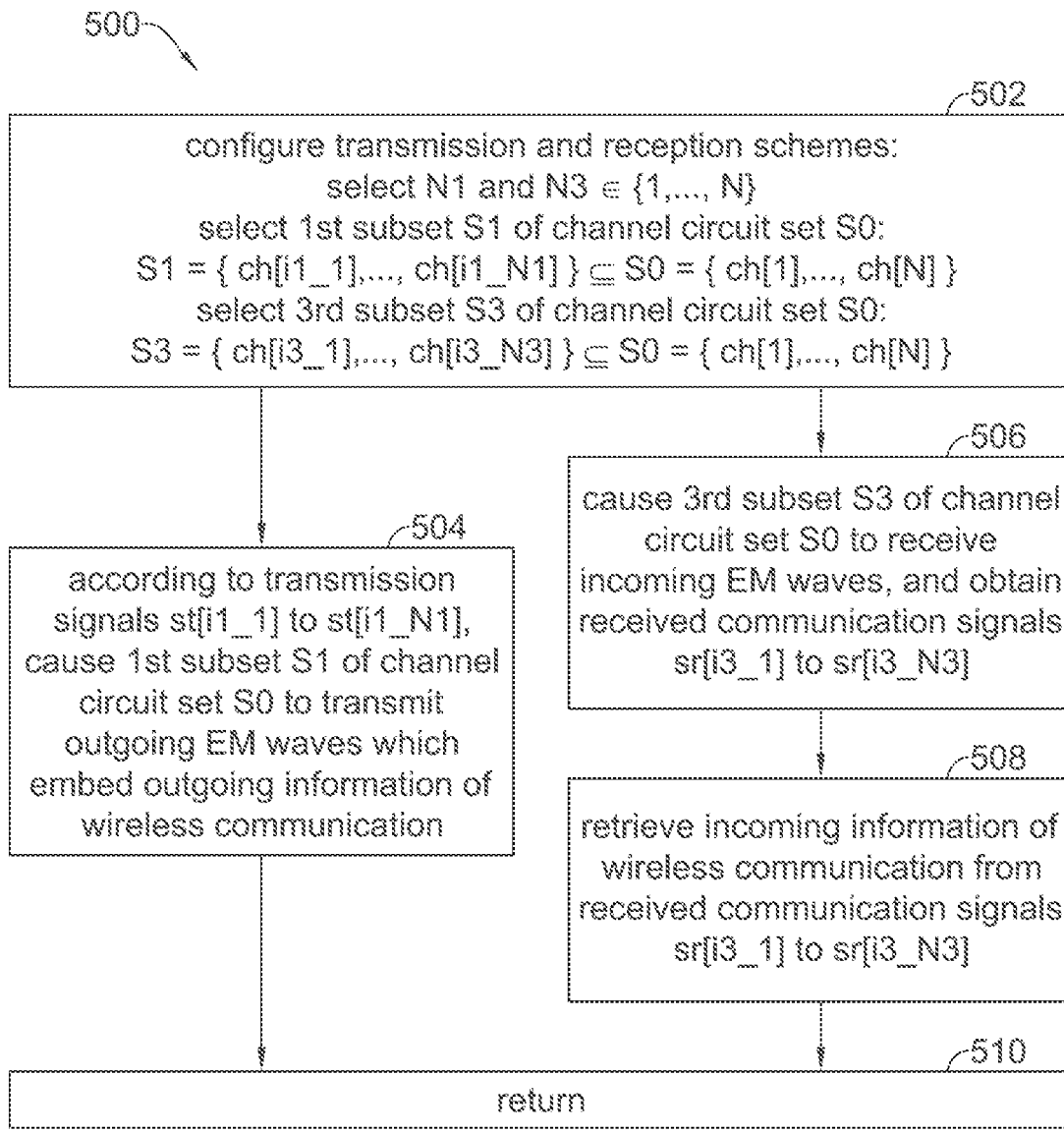

FIG. 5 depicts steps of the communication procedure 500 shown in FIG. 2. By referring to FIG. 5, steps of the procedure 500 may be described as follows.

Step 502: the UE 10 (e.g., the processor 120) may determine configuration of transmission and reception schemes according to one or more system requirements. For example, according to a first subset of the system requirement(s), the UE 10 may determine an integer N1 indicating how many channel circuits should be included in a first subset S1 of the channel circuit set S0, wherein the first subset of the system requirement(s) may relate to transmission demands of wireless communication, etc. Also, according to a third subset of the system requirement(s), the UE 10 may determine an integer N3 indicating how many channel circuits should be included in a third subset S3 of the channel circuit set S0, wherein the third subset of the system requirement(s) may relate to reception demands of wireless communication, etc. The integer N3 may be equal to or different from the integer N1. When determining the integers N1 and N3, the UE 10 may select each of the integers N1 and N3 from 1 to N. For example, when determining the integer N1, the UE 10 may select an integer close to or equal to the index N if the first subset of the system requirement(s) demands high transmission quality; and/or, when determining the integer N3, the UE 10 may select an integer close to or equal to the index N if the third subset of system requirement(s) demands high reception quality.

The UE 10 may then select one or more channel circuits ch[i1_1] to ch[i1_N1] from the channel circuits ch[1] to ch[N] in the channel circuit set S0 (for indices i1_1 to i1_N1 being different ones of 1 to N if N1>1), and may include the selected one or more channel circuits ch[i1_1] to ch[i1_N1] in the first subset S1 of the channel circuit set S0. The UE 10 may also select one or more channel circuits ch[i3_1] to ch[i3_N3] from the channel circuits ch[1] to ch[N] in the channel circuit set S0 (for indices i3_1 to i3_N3 being different ones of 1 to N if N3>1), and may include the selected one or more channel circuits ch[i3_1] to ch[i3_N3] in the third subset S3 of the channel circuit set S0.

The one or more channel circuits ch[i1_1] to ch[i1_N1] in the first subset S1 of the channel circuit set S0 may be associated with one or more radiators a[j1_1] to a[j1_K1] included in the radiator set A0, with indices j1_1 to j1_K1 being different ones of 1 to K if K1>1; the one or more radiators a[j1_1] to a[j1_K1] may form a first subset A1 of the radiator set A0. The one or more channel circuits ch[i1_1] to ch[i1_N1] may be associated with one or more transmission circuits tx[i1_1] to tx[i1_N1] included in the inner circuit set U0. The one or more channel circuits ch[i3_1] to ch[i3_N3] in the third subset S3 of the channel circuit set S0 may be associated with one or more radiators a[j3_1] to a[j3_K3] included in the radiator set A0, with indices j3_1 to j3_K3 being different ones of 1 to K if K3>1; the one or more radiators a[j3_1] to a[j3_K3] may form a third subset A3 of the radiator set A0. The one or more channel circuits ch[i3_1] to ch[i3_N3] may be associated with one or more reception circuits rx[i3_1] to rx[i3_N3] included in the inner circuit set U0. In an embodiment, the third subset A3 of the radiator set A0 may equal the first subset A1 of the radiator set A0.

Step 504: the UE 10 (e.g., the processor 120) may cause the one or more transmission circuits tx[i1_1] to tx[i1_N1], the one or more channel circuits ch[i1_1] to ch[i1_N1] included in the first subset S1 of the channel circuit set S0, and the associated one or more radiators a[j1_1] to a[j1_K1] in the AiM 100 to transmit outgoing EM waves. For example, the UE 10 (e.g., the processor 120) may cause the modem 110 to form one or more transmission signals st[i1_1] to st[i1_N1] output to the one or more transmission circuits tx[i1_1] to tx[i1_N1], so the one or more radiators a[j1_1] to a[j1_K1] may be fed via the one or more transmission circuits tx[i1_1] to tx[i1_N1] and the one or more channel circuits ch[i1_1] to ch[i1_N1] according to the one or more signals st[i1_1] to st[i1_N1]. Since the procedure 500 may only need to implement wireless communication, the processor 120 may cause the signals st[i1_1] to st[i1_N1] to embed outgoing information of wireless communication according to protocol(s) of the wireless communication, so the resultant outgoing EM waves transmitted at step 504 may be identified as EM waves of the wireless communication when received by remote participant(s). It is noted that the outgoing EM waves may be transmitted by circular polarization, or may be transmitted by other polarization different from circular polarization, e.g., may be transmitted by linear polarization.

Step 506: the UE 10 (e.g., the processor 120) may cause the radiators a[j3_1] to a[j3_K3] included in the third subset of the radiator set A0, the one or more channel circuits ch[i3_1] to ch[i3_N3] included in the third subset S3 of the channel circuit set S0, and the associated one or more reception circuits rx[i3_1] to rx[i3_N3] to receive incoming EM waves, and to accordingly form one or more received communication signals sr[i3_1] to sr[i3_N3] output from the one or more reception circuits rx[i3_1] to rx[i3_N3] to the modem 110. The UE 10 may therefore obtain the one or more received communication signals sr[i3_1] to sr[i3_N3]. It is noted that the incoming EM waves may be received by circular polarization, or may be received by other polarization different from circular polarization, e.g., may be received by linear polarization.

Step 508: according to protocol(s) of the wireless communication, the UE 10 (e.g., the processor 120) may retrieve incoming information of the wireless communication from the one or more received communication signals sr[i3_1] to sr[i3_N3].

Step 510: the UE 10 (e.g., the processor 120) may end the procedure 500 and return to step 205 (FIG. 2).

Figure 6A:
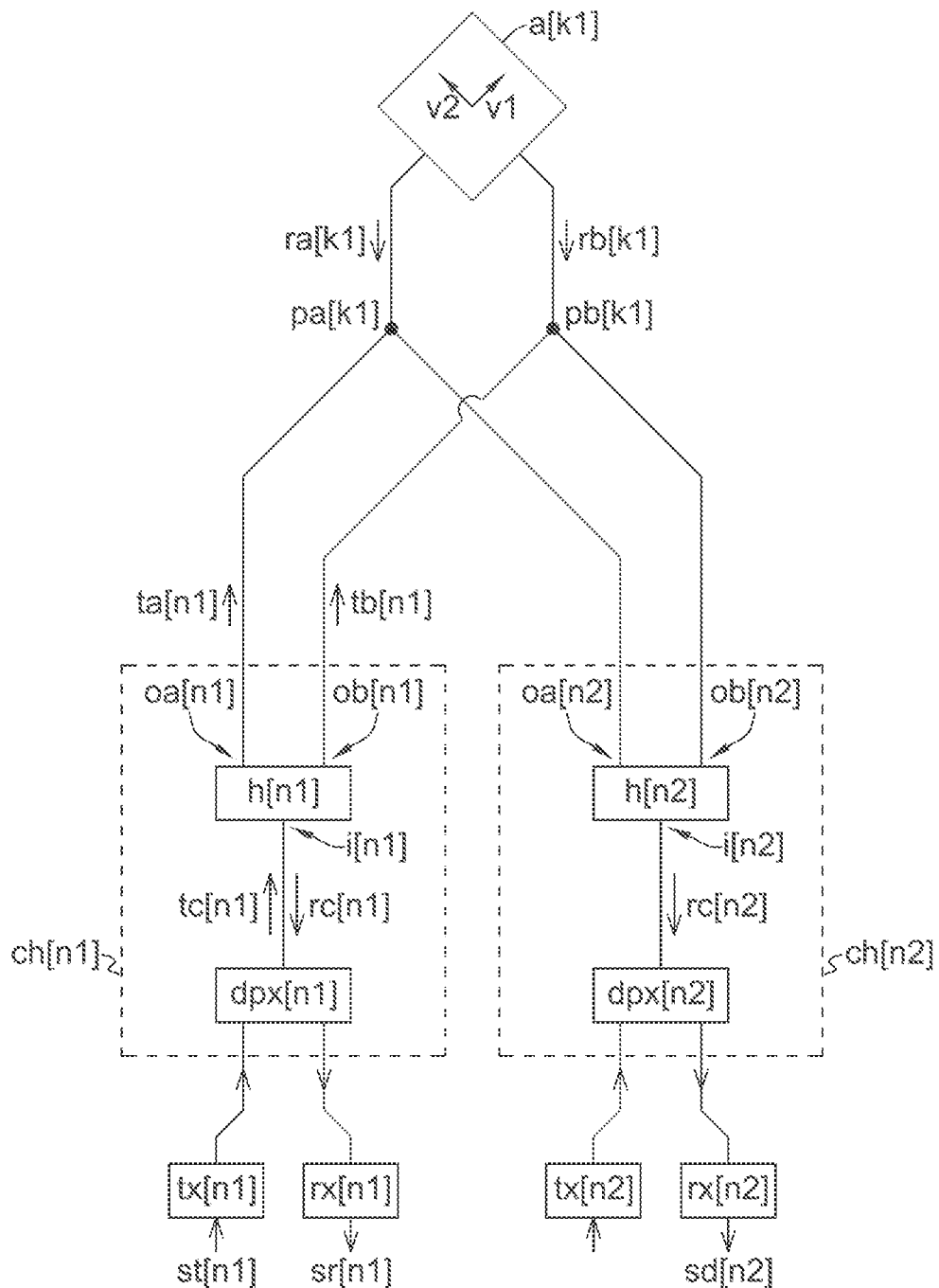

FIG. 6a schematically depicts a radiator a[k1] associated with two channel circuits ch[n1] and ch[n2], two transmission circuits tx[n1] and tx[n2], and two reception circuits rx[n1] and rx[n2] according to an embodiment of the invention. In an embodiment, the radiator a[k1] may be one of the radiators a[1] to a[K] (FIG. 1) with index k1 being one of 1 to K, the channel circuits ch[n1] and ch[n2] may be different two of the channel circuits ch[1] to ch[N] (FIG. 1) with indices n1 and n2 being different two of 1 to N, the transmission circuits tx[n1] and tx[n2] may be different two of transmission circuits tx[1] to tx[N] (FIG. 1), and the reception circuits rx[n1] and rx[n2] may be different two of the reception circuits rx[1] to rx[N] (FIG. 1).

The radiator a[k1] may comprise two ports pa[k1] and pb[k1] respectively associated with linearly polarized resonances of two directions v1 and v2, and the two directions v1 and v2 may not be parallel, e.g., may be perpendicular to each other. The channel circuit ch[n1] may comprise an RF frontend circuit h[n1] and a duplexer dpx[n1]. The RF frontend circuit h[n1] may comprise terminals i[n1], oa[n1] and ob[n1] as one inbound terminal and two outbound terminals respectively, and the terminals i[n1], oa[n1] and ob[n1] may be coupled to the duplexer dpx[n1] and the two ports pa[k1] and pb[k1] respectively; the duplexer dpx[n1] may further be coupled to the transmission circuit tx[n1] and the reception circuit rx[n1]. The channel circuit ch[n2] may comprise an RF frontend circuit h[n2] and a duplexer dpx[n2]. The RF frontend circuit h[n2] may comprise terminals i[n2], oa[n2] and ob[n2] as one inbound terminal and two outbound terminals respectively, and the terminals i[n2], oa[n2] and ob[n2] may be coupled to the duplexer dpx[n2] and the two ports pa[k1] and pb[k1] respectively; the duplexer dpx[n2] may further be coupled to the transmission circuit tx[n2] and the reception circuit rx[n2]. Circuitry of the RF frontend circuits h[n1] and h[n2] may be similar or substantially the same, circuitry of the duplexers dpx[n1] and dpx[n2] may be similar or substantially the same, circuitry of the transmission circuits tx[n1] and tx[n2] may be similar or substantially the same, and circuitry of the reception circuits rx[n1] and rx[n2] may be similar or substantially the same.

In an embodiment, the UE 10 (e.g., the processor 120) may select the channel circuit ch[n1] as one of the channel circuits ch[i1_1] to ch[i1_N1] in the first subset S1 of the channel circuit set S0 (with the index n1 being one of i1_1 to i1_N1) at step 302, 402 or 502 (FIG. 3, 4 or 5), may select the channel circuit ch[n2] as one of the channel circuits ch[i2_1] to ch[i2_N2] in the second subset S2 of the channel circuit set S0 (with the index n2 being one of i2_1 to i2_N2) at step 302 or 402, and may select the channel circuit ch[n1] as one of the channel circuits ch[i3_1] to ch[i3_N3] in the third subset S3 of the channel set S0 (with the index n1 being one of i3_1 to i3_N3) at step 402 or 502.

At step 304 or 404, when the processor 120 causes the modem 110 (FIG. 1) to output the signals st[i1_1] to st[i1_N1] to the transmission circuits tx[i1_1] to tx[i1_N1], one of the signals st[i1_1] to st[i1_N1] may be output to the transmission circuit tx[n1] (FIG. 6a) as a signal st[n1]; in response to the signal st[n1], the transmission circuit tx[n1] and the duplexer dpx[n1] may form an outgoing signal tc[n1] at the terminal i[n1]. According to the signal tc[n1], the RF frontend circuit h[n1] in the channel circuit ch[n1] may form signals ta[n1] and tb[n1] respectively at the terminals oa[n1] and ob[n1], may cause the signal ta[n1] at the terminal oa[n1] and the signal tc[n1] at the terminal i[n1]

to have a first phase shift, may cause the signal tb[n1] at the terminal ob[n1] and the signal tc[n1] at the terminal i[n1] to have a second phase shift, and may cause the first phase shift and the second phase shift to be different, e.g., to be substantially different by 90 degrees. The channel circuit ch[n1] may feed the signals ta[n1] and tb[n1], which may result from the same signal tc[n1] but may have different phase shifts, to the ports pa[k1] and pa[k2] of the radiator a[k1] respectively, so the radiator a[k1] may transmit EM waves resulting from the signal st[n1] by circular polarization of the first rotation sense. At step 504, the RF frontend circuit h[n1] may also cause the signals ta[n1] and tc[n1] to have a first phase shift, may also cause the signals tb[n1] and tc[n1] to have a second phase shift, but may cause the first phase shift and the second phase shift to be substantially different by 90 degrees, to be different by an angle other than 90 degrees, or to be substantially equal, so the radiator a[k1] may transmit EM waves resulting from the signal st[n1] by circular polarization of the first rotation sense, or by other polarization different from circular polarization of the first rotation sense.

At step 306 or 406, when the radiator a[k1] receives EM waves, the radiator a[k1] may respectively form signals ra[k1] and rb[k1] at the ports pa[k1] and pb[k1] coupled to the terminals oa[n2] and ob[n2]. In response to the signals ra[k1] and rb[k1], the RF frontend circuit h[n2] in the channel circuit ch[n2] may form a signal rc[n2] at the terminal i[n2], may cause the signal ra[k1] at the terminal oa[n2] and the signal rc[n2] at the terminal i[n2] to have a third phase shift, may cause the signal rb[k1] at the terminal ob[n2] and the signal rc[n2] at the terminal i[n2] to have a fourth phase shift, and may cause the third phase shift and the fourth phase shift to be different, e.g., to be substantially different by −90 degrees. By operations of the RF frontend circuit h[n2], the radiator a[k1] may receive EM waves by circular polarization of the second rotation sense opposite to the first rotation sense. In response to the signal rc[n2], the duplexer dpx[n2] and the reception circuit rx[n2] may form a signal sd[n2] to be one of the received detection signals sd[i2_1] to sd[i2_N2] output to the modem 110 (FIG. 1). In an embodiment, a difference between the first phase shift and the second phase shift may be different from a difference between the third phase shift and the fourth phase shift.

At step 412, when the radiator a[k1] receives EM waves, the radiator a[k1] may also form signals ra[k1] and rb[k1] at the ports pa[k1] and pb[k1] coupled to the terminals oa[n1] and ob[n1]. In response to the signals ra[k1] and rb[k1], the RF frontend circuit h[n1] in the channel circuit ch[n1] may form a signal rc[n1] at the terminal i[n1], may cause the signal ra[k1] at the terminal oa[n1] and the signal rc[n1] at the terminal i[n1] to have a fifth phase shift, may cause the signal rb[k1] at the terminal ob[n1] and the signal rc[n1] at the terminal i[n1] to have a sixth phase shift, and may cause the fifth phase shift and the sixth phase shift to be different, e.g., to be substantially different by 90 degrees. By operations of the RF frontend circuit h[n1], the radiator a[k1] may receive EM waves by circular polarization of the first rotation sense opposite to the second rotation sense. In response to the signal rc[n1], the duplexer dpx[n1] and the reception circuit rx[n1] may form a signal sr[n1] to be one of the received communication signals sr[i3_1] to sr[i3_N3]. In an embodiment, a difference between the fifth phase shift and the sixth phase shift may substantially equal the difference between the first phase shift and the second phase shift, but may be different from the difference between the third phase shift and the fourth phase shift.

At step 506, when the radiator a[k1] receives EM waves, the radiator a[k1] may also form signals ra[k1] and rb[k1] at the ports pa[k1] and pa[k2] coupled to the terminals ra[n1] and rb[n1], the RF frontend circuit h[n1] in the channel circuit ch[n1] may form a signal rc[n1] at the terminal i[n1], may cause the signal ra[k1] and the signal rc[n1] to have a seventh phase shift, may cause the signal rb[k1] and the signal rc[n1] to have an eighth phase shift, and may cause the seventh phase shift and the eighth phase shift to be substantially different by 90 degrees, to be different by an angle other than 90 degrees, or to be substantially equal. By operations of the RF frontend circuit h[n1], the radiator a[k1] may receive EM waves by circular polarization of the first rotation sense, or by other polarization different from the circular polarization of the first rotation sense. In response to the signal rc[n1], the duplexer dpx[n1] and the reception circuit rx[n1] may form a signal sr[n1] as one of the received communication signals sr[i3_1] to sr[i3_N3].

Figure 6B:
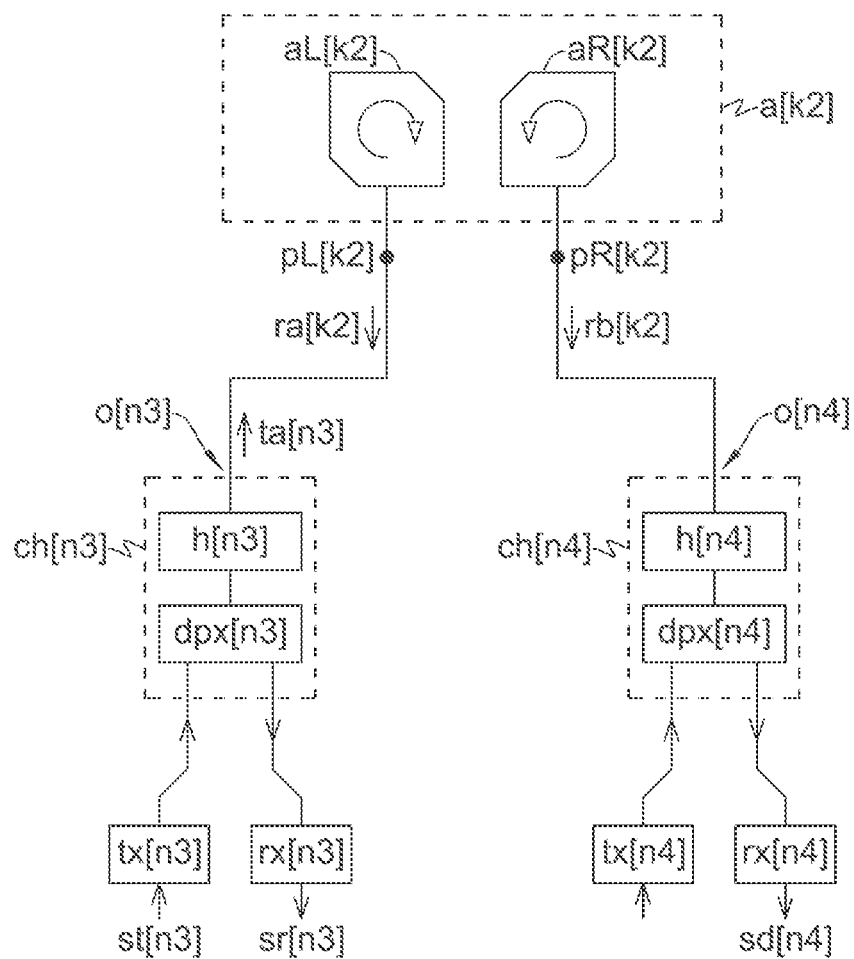

FIG. 6b schematically depicts a radiator a[k2] associated with two channel circuits ch[n3] and ch[n4], two transmission circuits tx[n3] and tx[n4], and two reception circuits rx[n3] and rx[n4] according to an embodiment of the invention. In an embodiment, the radiator a[k2] may be one of the radiators a[1] to a[K] (FIG. 1) with index k2 being one of 1 to K, the channel circuits ch[n3] and ch[n4] may be different two of the channel circuits ch[1] to ch[N] (FIG. 1) with indices n3 and n4 being different two of 1 to N, the transmission circuits tx[n3] and tx[n4] may be different two of transmission circuits tx[1] to tx[N] (FIG. 1), and the reception circuits rx[n3] and rx[n4] may be different two of the reception circuits rx[1] to rx[N] (FIG. 1).

The radiator a[k2] may comprise two ports pL[k2] and pR[k2], and two circular polarization antennas aL[k2] and aR[k2]. The circular polarization antenna aL[k2] may transmit and receive EM waves by circular polarization of the first rotation sense, and the circular polarization antenna aR[k2] may transmit and receive EM waves by circular polarization of the second rotation sense. The two ports pL[k2] and pR[k2] may be coupled to the two circular polarization antennas aL[k2] and aR[k2], and may thereby be associated with circularly polarized resonances of the first rotation sense and the second rotation sense, respectively. The channel circuit ch[n3] may comprise a terminal o[n3], an RF frontend circuit h[n3] and a duplexer dpx[n3]; the terminal o[n3] may be coupled to the port pL[k2], the RF frontend circuit h[n3] may be coupled between the terminal o[n3] and the duplexer dpx[n3], and the duplexer dpx[n3] may further be coupled to the transmission circuit tx[n3] and the reception circuit rx[n3]. The channel circuit ch[n4] may comprise a terminal o[n4], an RF frontend circuit h[n4] and a duplexer dpx[n4]; the terminal o[n4] may be coupled to the port pR[k2], the RF frontend circuit h[n4] may be coupled between the terminal o[n4] and the duplexer dpx[n4], and the duplexer dpx[n4] may further be coupled to the transmission circuit tx[n4] and the reception circuit rx[n4]. Circuitry of the RF frontend circuits h[n3] and h[n4] may be similar or substantially the same, circuitry of the duplexers dpx[n3] and dpx[n4] may be similar or substantially the same, circuitry of the transmission circuits tx[n3] and tx[n4] may be similar or substantially the same, and circuitry of the reception circuits rx[n3] and rx[n4] may be similar or substantially the same.

In an embodiment, the UE 10 (e.g., the processor 120) may select the channel circuit ch[n3] as one of the channel circuits ch[i1_1] to ch[i1_N1] in the first subset S1 of the channel circuit set S0 (with the index n3 being one of i1_1 to i1_N1) at step 302, 402 or 502 (FIG. 3, 4 or 5), may select the channel circuit ch[n4] as one of the channel circuits ch[i2_1] to ch[i2_N2] in the second subset S2 of the channel circuit set S0 (with the index n4 being one of i2_1 to i2_N2) at step 302 or 402, and may select the channel circuit ch[n3] as one of the channel circuits ch[i3_1] to ch[i3_N3] in the third subset S3 of the channel set S0 (with the index n3 being one of i3_1 to i3_N3) at step 402 or 502.

At step 304, 404 or 504, when the processor 120 causes the modem 110 (FIG. 1) to output the signals st[i1_1] to st[i1_N1] to the transmission circuits tx[i1_1] to tx[i1_N1], one of the signals st[i1_1] to st[i1_N1] may be output to the transmission circuit tx[n3] (FIG. 6b) as a signal st[n3]; in response to the signal st[n3], the transmission circuit tx[n3] and the channel circuit ch[n3] may form a signal ta[n3] at the terminal o[n3] coupled to the port pL[k2], so the circular polarization antenna aL[k2] of the radiator a[k2] may transmit EM waves resulting from the signal st[n3] by circular polarization of the first rotation sense. If necessary (e.g., for beam forming and/or beam steering), the RF frontend circuit h[n3] in the channel circuit ch[n3] may cause the signals ta[n3] and st[n3] to have a phase shift and/or an amplitude scaling when forming the signal ta[n3].

At step 306 or 406, when the radiator a[k2] receives EM waves, the circular polarization antenna aR[k2] may form a signal rb[k2] at the port pR[k2] coupled to the terminals o[n4]. In response to the signal rb[k2], the channel circuit ch[n4] and the reception circuit rx[n4] may form a signal sd[n4] to be one of the received detection signals sd[i2_1] to sd[i2_N2]. If necessary, the RF frontend circuit h[n4] in the channel circuit ch[n4] may cause the signals rb[k2] and sd[n4] to have a phase shift and/or an amplitude scaling when forming the signal sd[n4].

At step 412 or 506, when the radiator a[k2] receives EM waves, the circular polarization antenna aL[k2] may form a signal ra[k2] at the port pL[k2] coupled to the terminals o[n3]. In response to the signal ra[k2], the channel circuit ch[n3] and the reception circuit rx[n3] may form a signal sr[n3] to be one of the received communication signals sr[i3_1] to sr[i3_N3]. If necessary, the RF frontend circuit h[n3] in the channel circuit ch[n3] may cause the signals ra[k2] and sr[n3] to have a phase shift and/or an amplitude scaling when forming the signal sr[n3].

Figure 6C:
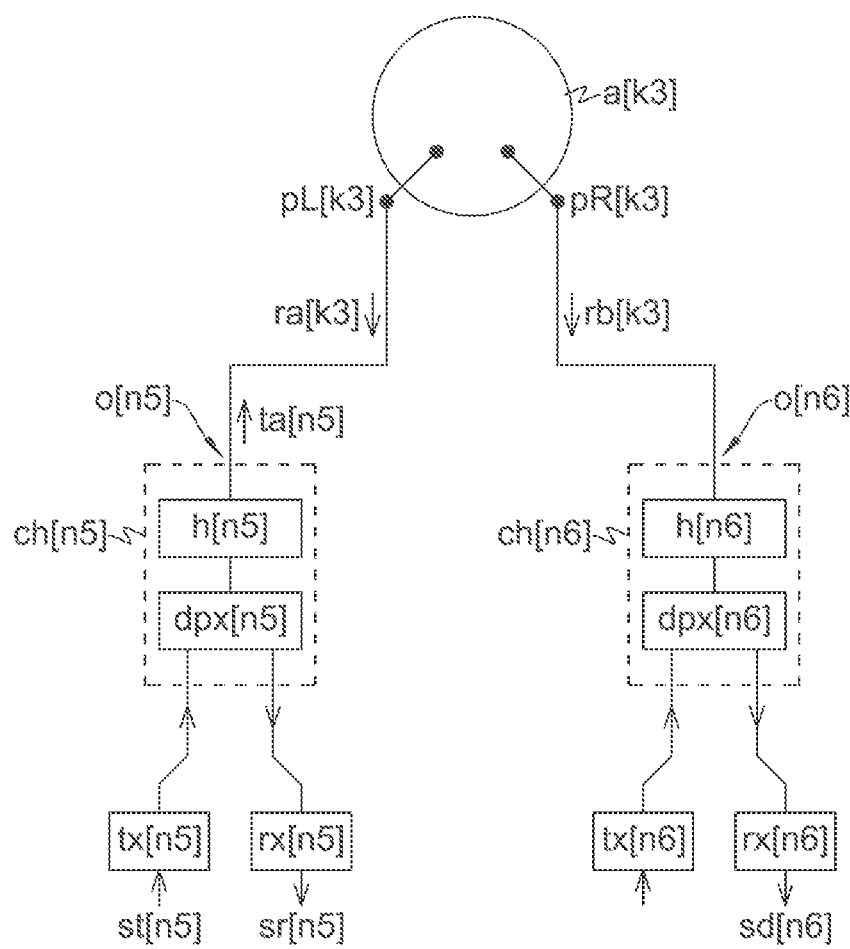

FIG. 6c schematically depicts a radiator a[k3] associated with two channel circuits ch[n5] and ch[n6], two transmission circuits tx[n5] and tx[n6], and two associated reception circuits rx[n5] and rx[n6] according to an embodiment of the invention. In an embodiment, the radiator a[k3] may be one of the radiators a[1] to a[K] (FIG. 1) with index k3 being one of 1 to K, the channel circuits ch[n5] and ch[n6] may be different two of the channel circuits ch[1] to ch[N] (FIG. 1) with indices n5 and n6 being different two of 1 to N, the transmission circuits tx[n5] and tx[n6] may be different two of transmission circuits tx[1] to tx[N] (FIG. 1), and the reception circuits rx[n5] and rx[n6] may be different two of the reception circuits rx[1] to rx[N] (FIG. 1).

The radiator a[k3] may comprise two ports pL[k3] and pR[k3]; the ports pL[k3] and pR[k3] may be associated with circularly polarized resonances of the first rotation sense and the second rotation sense, respectively. The channel circuit ch[n5] may comprise a terminal o[n5], an RF frontend circuit h[n5] and a duplexer dpx[n5]; the terminal o[n5] may be coupled to the port pL[k3], the RF frontend circuit h[n5] may be coupled between the terminal o[n5] and the duplexer dpx[n5], and the duplexer dpx[n5] may further be coupled to the transmission circuit tx[n5] and the reception circuit rx[n5]. The channel circuit ch[n6] may comprise a terminal o[n6], an RF frontend circuit h[n6] and a duplexer dpx[n6]; the terminal o[n6] may be coupled to the port pR[k3], the RF frontend circuit h[n6] may be coupled between the terminal o[n6] and the duplexer dpx[n6], and the duplexer dpx[n6] may further be coupled to the transmission circuit tx[n6] and the reception circuit rx[n6]. Circuitry of the RF frontend circuits h[n5] and h[n6] may be similar or substantially the same, circuitry of the duplexers dpx[n5] and dpx[n6] may be similar or substantially the same, circuitry of the transmission circuits tx[n5] and tx[n6] may be similar or substantially the same, and circuitry of the reception circuits rx[n5] and rx[n6] may be similar or substantially the same.

In an embodiment, the UE 10 (e.g., the processor 120) may select the channel circuit ch[n5] as one of the channel circuits ch[i1_1] to ch[i1_N1] in the first subset S1 of the channel circuit set S0 (with the index n1 being one of i1_1 to i1_N1) at step 302, 402 or 502 (FIG. 3, 4 or 5), may select the channel circuit ch[n6] as one of the channel circuits ch[i2_1] to ch[i2_N2] in the second subset S2 of the channel circuit set S0 (with the index n2 being one of i2_1 to i2_N2) at step 302 or 402, and may select the channel circuit ch[n5] as one of the channel circuits ch[i3_1] to ch[i3_N3] in the third subset S3 of the channel set S0 (with the index n1 being one of i3_1 to i3_N3) at step 402 or 502.

At step 304, 404 or 504, when the processor 120 causes the modem 110 (FIG. 1) to output the signals st[i1_1] to st[i1_N1] to the transmission circuits tx[i1_1] to tx[i1_N1], one of the signals st[i1_1] to st[i1_N1] may be output to the transmission circuit tx[n5] (FIG. 6c) as a signal st[n5]; in response to the signal st[n5], the transmission circuit tx[n5] and the channel circuit ch[n5] may form a signal ta[n5] at the terminal o[n5] coupled to the port pL[k3], so the radiator a[k3] may transmit EM waves resulting from the signal st[n5] by circular polarization of the first rotation sense. If necessary, the RF frontend circuit h[n5] in the channel circuit ch[n5] may cause the signals ta[n5] and st[n5] to have a phase shift and/or an amplitude scaling when forming the signal ta[n5].

At step 306 or 406, when the radiator a[k3] receives EM waves, the radiator a[k3] may form a signal rb[k3] at the port pR[k3] coupled to the terminals o[n6]. In response to the signal rb[k3], the channel circuit ch[n6] and the reception circuit rx[n6] may form a signal sd[n6] to be one of the received detection signals sd[i2_1] to sd[i2_N2]. If necessary, the RF frontend circuit h[n6] in the channel circuit ch[n6] may cause the signals rb[k3] and sd[n6] to have a phase shift and/or an amplitude scaling when forming the signal sd[n6].

At step 412 or 506, when the radiator a[k3] receives EM waves, the radiator a[k3] may form a signal ra[k3] at the port pL[k3] coupled to the terminals o[n5]. In response to the signal ra[k3], the channel circuit ch[n5] and the reception circuit rx[n5] may form a signal sr[n5] to be one of the received communication signals sr[i3_1] to sr[i3_N3]. If necessary, the RF frontend circuit h[n5] in the channel circuit ch[n5] may cause the signals ra[k3] and sr[n5] to have a phase shift and/or an amplitude scaling when forming the signal sr[n5].

Figure 6D:
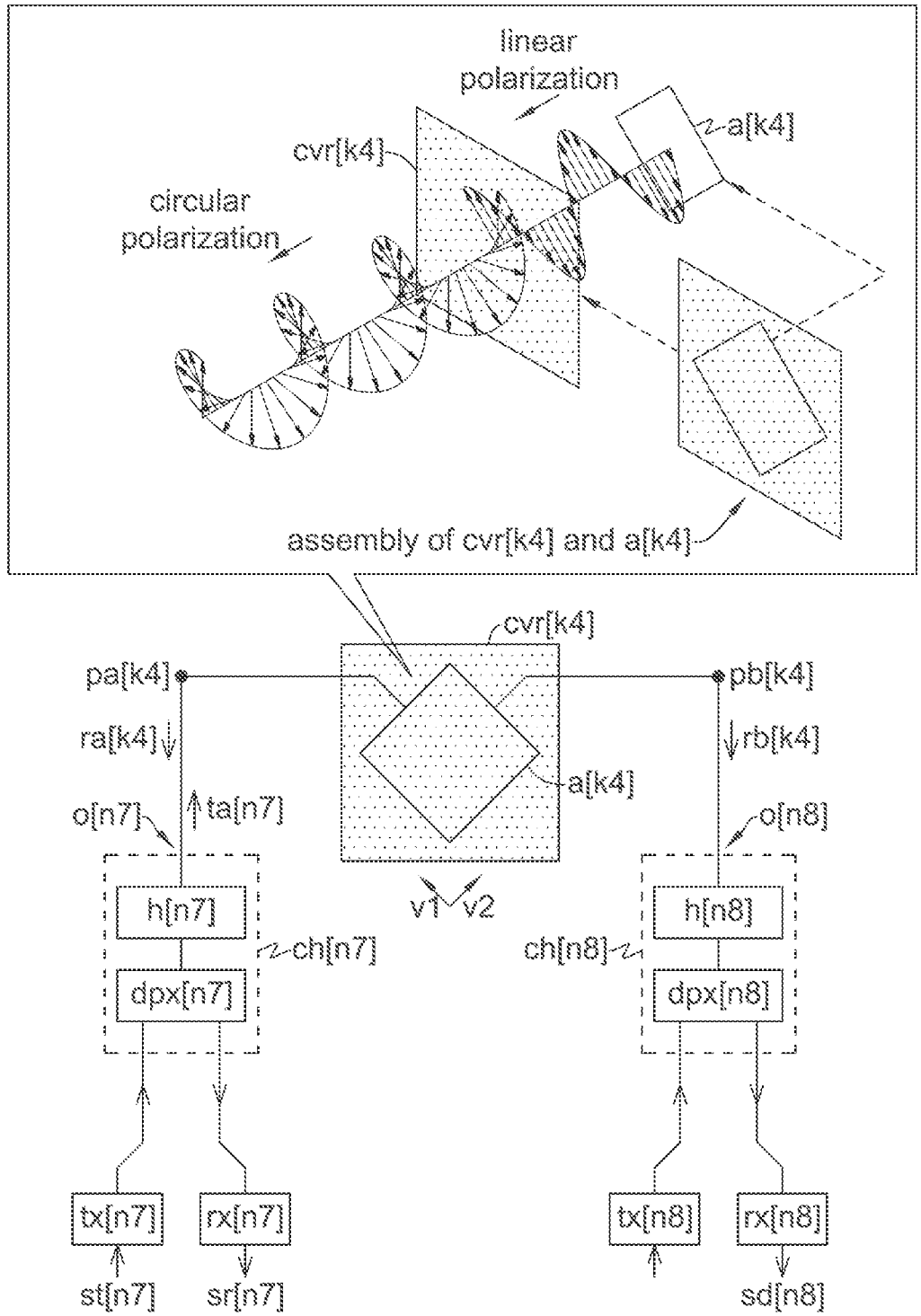

FIG. 6d schematically depicts a radiator a[k4] associated with two channel circuits ch[n7] and ch[n8], two transmission circuits tx[n7] and tx[n8], and two reception circuits rx[n7] and rx[n8] according to an embodiment of the invention. In an embodiment, the radiator a[k4] may be one of the radiators a[1] to a[K] (FIG. 1) in the AiM 100 (FIG. 1), with index k4 being one of 1 to K. The AiM 100 may further comprise a polarizer (not depicted in FIG. 1) covering an outward surface of the AiM 100, and a portion of the polarizer covering over the radiator a[k4] may be conceptually depicted as a polarizer portion cvr[k4] in FIG. 6d. The channel circuits ch[n7] and ch[n8] may be different two of the channel circuits ch[1] to ch[N] (FIG. 1) with indices n7 and n8 being different two of 1 to N, the transmission circuits tx[n7] and tx[n8] may be different two of transmission circuits tx[1] to tx[N] (FIG. 1), and the reception circuits rx[n7] and rx[n8] may be different two of the reception circuits rx[1] to rx[N] (FIG. 1).

The radiator a[k4] may comprise two ports pa[k4] and pb[k4]; the ports pa[k4] and pb[k4] may be associated with linearly polarized resonances of two different directions v1 and v2, respectively. The directions v1 and v2 may not be parallel, e.g., may be perpendicular. The polarizer portion cvr[k4] may transform linear polarization of the directions v1 and v2 to circular polarization of the first rotation sense and the second rotation sense, respectively. The channel circuit ch[n7] may comprise a terminal o[n7], an RF frontend circuit h[n7] and a duplexer dpx[n7]; the terminal o[n7] may be coupled to the port pa[k4], the RF frontend circuit h[n7] may be coupled between the terminal o[n7] and the duplexer dpx[n7], and the duplexer dpx[n7] may further be coupled to the transmission circuit tx[n7] and the reception circuit rx[n7]. The channel circuit ch[n8] may comprise a terminal o[n8], an RF frontend circuit h[n8] and a duplexer dpx[n8]; the terminal o[n8] may be coupled to the port pb[k4], the RF frontend circuit h[n8] may be coupled between the terminal o[n8] and the duplexer dpx[n8], and the duplexer dpx[n8] may further be coupled to the transmission circuit tx[n8] and the reception circuit rx[n8]. Circuitry of the RF frontend circuits h[n7] and h[n8] may be similar or substantially the same, circuitry of the duplexers dpx[n7] and dpx[n8] may be similar or substantially the same, circuitry of the transmission circuits tx[n7] and tx[n8] may be similar or substantially the same, and circuitry of the reception circuits rx[n7] and rx[n8] may be similar or substantially the same.

In an embodiment, the UE 10 (e.g., the processor 120) may select the channel circuit ch[n7] as one of the channel circuits ch[i1_1] to ch[i1_N1] in the first subset S1 of the channel circuit set S0 (with the index n1 being one of i1_1 to i1_N1) at step 302, 402 or 502 (FIG. 3, 4 or 5), may select the channel circuit ch[n8] as one of the channel circuits ch[i2_1] to ch[i2_N2] in the second subset S2 of the channel circuit set S0 (with the index n2 being one of i2_1 to i2_N2) at step 302 or 402, and may select the channel circuit ch[n7] as one of the channel circuits ch[i3_1] to ch[i3_N3] in the third subset S3 of the channel set S0 (with the index n1 being one of i3_1 to i3_N3) at step 402 or 502.

At step 304, 404 or 504, when the processor 120 causes the modem 110 (FIG. 1) to output the signals st[i1_1] to st[i1_N1] to the transmission circuits tx[i1_1] to tx[i1_N1], one of the signals st[i1_1] to st[i1_N1] may be output to the transmission circuit tx[n7] (FIG. 6d) as a signal st[n7]; in response to the signal st[n7], the transmission circuit tx[n7] and the channel circuit ch[n7] may form a signal ta[n7] at the terminal o[n7] coupled to the port pa[k4]; via the polarizer portion cvr[k4], the radiator a[k4] may transmit EM waves resulting from the signal st[n7] by circular polarization of the first rotation sense. If necessary, the RF frontend circuit h[n7] in the channel circuit ch[n7] may cause the signals ta[n7] and st[n7] to have a phase shift and/or an amplitude scaling when forming the signal ta[n7].

At step 306 or 406, when the radiator a[k4] receives EM waves via the polarizer portion cvr[k4], the radiator a[k4] may form a signal rb[k4] at the port pb[k4] coupled to the terminals o[n8]. In response to the signal rb[k4], the channel circuit ch[n8] and the reception circuit rx[n8] may form a signal sd[n8] to be one of the received detection signals sd[i2_1] to sd[i2_N2]. If necessary, the RF frontend circuit h[n8] in the channel circuit ch[n8] may cause the signals rb[k4] and sd[n8] to have a phase shift and/or an amplitude scaling when forming the signal sd[n8].

At step 412 or 506, when the radiator a[k4] receives EM waves via the polarizer portion cvr[k4], the radiator a[k4] may form a signal ra[k4] at the port pa[k4] coupled to the terminals o[n7]. In response to the signal ra[k4], the channel circuit ch[n7] and the reception circuit rx[n7] may form a signal sr[n7] to be one of the received communication signals sr[i3_1] to sr[i3_N3]. If necessary, the RF frontend circuit h[n7] in the channel circuit ch[n7] may cause the signals ra[k4] and sr[n7] to have a phase shift and/or an amplitude scaling when forming the signal sr[n7].

FIG. 7 depicts an example of the AiM 100 of the UE 10 according to an embodiment of the invention. In the example shown in FIG. 7, the AiM 100 may comprise four radiators a[1] to a[4] (K=4) in the radiator set A0, eight channel circuits ch[1] to ch[8] (N=8) in the channel circuit set S0, and eight transmission circuits tx[1] to tx[8] and eight reception circuit rx[1] to rx[8] in the inner circuit set U0. Each radiator a[k] may be coupled to two associated channel circuits ch[2*k-1] and ch[2*k], for index k=1 to 4, i.e., the radiator a[1] may be coupled to the associated channel circuits ch[1] and ch[2], the radiator a[2] may be coupled to the associated channel circuits ch[3] and ch[4], etc. Each channel circuit ch[n], for index n=1 to 8, may be coupled to the associated transmission circuit tx[n] and reception circuit rx[n]. Each radiator a[k] (and the associated channel circuits ch[2*k-1] to ch[2*k], the associated transmission circuits tx[2*k-1] to tx[2*k] and the associated reception circuits rx[2*k-1] to rx[2*k]) may be implemented by one of the radiators a[k1], a[k2], a[k3] and a[k4] (and the associated pair of the channel circuits ch[n1] to ch[n2], ch[n3] to ch[n4], ch[n5] and ch[n6] and ch[n7] to ch[n8], the associated pair of the transmission circuits tx[n1] to tx[n2], tx[n3] to tx[n4], tx[n5] and tx[n6] and tx[n7] to tx[n8], and the associated pair of the reception circuits rx[n1] to rx[n2], rx[n3] to rx[n4], rx[n5] and rx[n6] and rx[n7] to rx[n8]) respectively depicted in FIGS. 6a to 6d.

In a first example of executing the flowchart 200 (FIG. 2), the UE 10 (e.g., the processor 120) may select to adopt a 1T1R configuration at step 302, 402 or 502 (FIG. 3, 4 or 5). For example, at step 302, 402 or 502, the processor 120 may set the integer N1 to one and may cause the first subset S1 of the channel circuit set S0 to include the channel circuit ch[i] (i1_1=1); at step 302 or 402, the processor 120 may set the integer N2 to one and may cause the second subset S2 of the channel circuit set S0 to include the channel circuit ch[2] (i2_1=2); at step 402 or 502, the processor 120 may set the integer N3 to one and may cause the third subset S3 of the channel circuit set S0 to include the channel circuit ch[i] (i3_1=1). Hence, the first subset A1 of the radiator set A0 may include the radiator a[i] (K1=1, j1_1=1) associated with the channel circuit ch[i], the second subset A2 of the radiator set A0 may include the radiator a[i] (K2=1, j2_1=1) associated with the channel circuit ch[2], and the third subset A3 of the radiator set A0 may include the radiator a[i] (K3=1, j3_1=1) associated with the channel circuit ch[i].

In a second example of executing the flowchart 200 (FIG. 2), the UE 10 (e.g., the processor 120) may select to adopt a 2T2R configuration at step 302, 402 or 502. For example, at step 302, 402 or 502, the processor 120 may set the integer N1 to two and may cause the first subset S1 of the channel circuit set S0 to include the channel circuits ch[i] and ch[3] (i1_1=1, i1_2=3); at step 302 or 402, the processor 120 may set the integer N2 to two and may cause the second subset S2 of the channel circuit set S0 to include the channel circuits ch[2] and ch[4] (i2_1=2, i2_2=4); at step 402 or 502, the processor 120 may set the integer N3 to two and cause the third subset S3 of the channel circuit set S0 to include the channel circuits ch[1] and ch[3] (i3_1=1, i3_2=3). Hence, the first subset A1 of the radiator set A0 may include the radiators a[1] and a[2] (K1=2, j1_1=1, j1_2=2) respectively associated with the channel circuits ch[1] and ch[3] in the first subset S1 of the channel circuit set S0, the second subset A2 of the radiator set A0 may include the radiators a[1] and a[2] (K2=2, j2_1=1, j2_2=2) respectively associated with the channel circuits ch[2] and ch[4] in the second subset S2 of the channel circuit set S0, and the third subset A3 of the radiator set A0 may include the radiators a[1] and a[2] (K3=2, j3_1=1, j3_2=2) associated with the channel circuit ch[1] and ch[3] in the third subset S3 of the channel circuit set S0. The UE 10 (e.g., the processor 120) may also select to adopt e.g., a 2T1R (N1=2, N2=N3=1), a 3T2R (N1=3, N2=N3=2) or a 4T4R (N1=4, N2=N3=4) configuration at step 302, 402 or 502.

FIG. 8 depicts a detection response according to an example of the invention. Under a condition that power transmitted by circular polarization of the first rotation sense is fixed, each of curves 800a and 800b may demonstrate relation between power received by circular polarization of the second rotation sense (longitudinal axis) and object distance (transverse axis), wherein the curve 800a may result from a configuration utilizing more radiators (and more channel circuits, more transmission circuits and more reception circuits) to transmit and receive, such as the 2T2R configuration; on the other hand, the curve 800b may result from another configuration utilized fewer radiators (and fewer channel circuits, fewer transmission circuits and fewer reception circuits) to transmit and receive, such as the 1T1R configuration.

As shown in FIG. 8, both the curves 800a and 800b show that the object distance between object and the AiM 100 may be well estimated if the power transmitted by polarization of the first rotation sense and the power received by polarization of the second rotation sense are known. It is then understood that the proximity detection at step 308 or 408 (FIG. 3 or 4) according to steps 304 and 306 or 404 and 406 is practicable, feasible and reliable, since power of the transmission signals st[i1_1] to st[i1_N1] at step 304 or 404 may indicate the power transmitted by polarization of the first rotation sense, and power of the received detection signals sd[i2_1] to sd[i2_N2] may indicate the power received by polarization of the second rotation sense.

As shown in FIG. 8, comparing to the curve 800b, the curve 800a may have better performance (e.g., higher signal-to-noise ratio, higher sensitivity, etc.) since the curve 800a results from the configuration utilizing more radiators. It is then understood that, at step 302 or 402, if the first subset or the second subset of the system requirement(s) demands better performance and/or higher quality, the UE 10 (e.g., the processor 120) may determine to set the integer N1 and/or N2 larger to include more channel circuits in the first subset S1 and/or the second subset S2 of the channel circuit set S0, so more radiators, more channel circuits and more transmission circuits may be utilized to transmit at step 304 or 404, and/or more radiators, more channel circuits and more reception circuits may be utilized to receive at step 306 or 406.

In FIG. 1 or 7, the UE 10 includes one AiM 100; however, the invention is not so limited. In an embodiment, the UE 10 according to the invention may comprise more than one AiMs; for example, the AiMs may be arranged to face one or more directions, and may therefore detect proximity from the one or more directions.

Each radiator a[k] in the AiM 100 (FIG. 1 or 7) may resonate over one or more operable frequency bands to transmit and receive, and the operable frequency band(s) may be arranged to cover one or more communication frequency bands allocated for wireless communication. In an embodiment, RF transmission and reception of each radiator may be circularly polarized only over a portion of the operable frequency band(s), and may not remain circularly polarized (e.g., may be linearly polarized) over rest portion of the operable frequency band(s). However, execution of the flowchart 200 (FIG. 2) will not be affected by limited bandwidth of the circularly polarized RF transmission and reception; the AiM 100 may still utilize said rest portion of the operable frequency band(s) to implement wireless communication, since EM waves of wireless communication may not need to be circularly polarized. For convenience of disclosure, said portion of the operable frequency band(s), over which the RF transmission and reception may remain circularly polarized, is referred to as circular polarization (CP) frequency band(s), while said rest portion of the operable frequency band(s), over which the RF transmission and reception may not remain circularly polarized, is referred to as non-CP (NCP) frequency band(s). In an embodiment, the CP frequency band(s) and the NCP frequency band(s) may not overlap.

In an embodiment, at step 404 (FIG. 4), when the UE 10 (e.g., the processor 120) causes the AiM 100 to transmit EM waves by circular polarization of the first rotation sense, the UE 10 may cause the AiM 100 to transmit EM waves by circular polarization of the first rotation sense over the CP frequency band(s), and may also cause the AiM 100 to transmit EM waves by other polarization over the NCP frequency bands; the transmission over the CP frequency band(s) may serve for wireless communication and the additional function(s) such as proximity detection, and the transmission over the NCP frequency band(s) may serve for wireless communication. In an embodiment, step 406 may be executed over the CP band(s).

To sum up, besides wireless communication, the invention may augment functionality of an AiM of a UE to additional function(s), such as proximity detection, by circularly polarized transmission and reception respectively in different rotation senses, and may further implement advanced function(s), such as dynamically and adaptively controlling transmission power of wireless communication, according to result(s) of the additional function(s). The invention may therefore expand functionality of the UE and improve performance of the UE; for example, the UE according to the invention may adaptively control transmission power of wireless communication according to whether proximity is detected, and may then improve transmission performance and quality without affecting compliance to safety regulations of RF exposure. The invention may also simplify architecture of UE, reduce component count of UE, and lower cost and time of manufacturing UE.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method augmenting functionality of an antenna-in-module (AiM) of a user equipment (UE) to proximity detection besides wireless communication; the method being executing by the UE, the AiM comprising a radiator set and a channel circuit set; the radiator set including one or more radiators, the channel circuit set including one or more channel circuits, each said channel circuit coupled to an associated said radiator in the radiator set, and the method comprising:
   causing a first subset of the channel circuit set to transmit outgoing electromagnetic (EM) waves by circular polarization of a first rotation sense;
   causing a second subset of the channel circuit set to receive incoming EM waves by circular polarization of a second rotation sense, and accordingly obtaining one or more received detection signals; and
   executing the proximity detection according to the one or more received detection signals; wherein:
   the first rotation sense and the second rotation sense are different.

2. The method of claim 1 further comprising:
   causing a third subset of the channel circuit set to receive the incoming EM waves by circular polarization of the first rotation sense, and accordingly obtaining one or more received communication signals; and
   retrieving incoming information of the wireless communication from the one or more received communication signals.

3. The method of claim 2, wherein the first subset of the channel circuit set is associated with a first subset of the radiator set, the third subset of the channel circuit set is associated with a third subset of the radiator set, and the third subset of the radiator set equals the first subset of the radiator set.

4. The method of claim 1 further comprising:
   when causing the first subset of the channel circuit set to transmit the outgoing EM waves by the circular polarization of the first rotation sense, causing the outgoing EM waves to embed outgoing information of the wireless communication.

5. The method of claim 1, wherein the first subset of the channel circuit set is associated with a first subset of the radiator set, the second subset of the channel circuit set is associated with a second subset of the radiator set, and the first subset of the radiator set equals the second subset of the radiator set.

6. The method of claim 1 further comprising:
   before causing the first subset of the channel circuit set to transmit the outgoing EM waves by the circular polarization of the first rotation sense, determining how many channel circuits are included in the first subset of the channel circuit set according to one or more system requirements.

7. The method of claim 6, wherein the one or more system requirements relates to at least one of the following:
   a signal-to-noise ratio of the proximity detection, and
   accuracy of the proximity detection.

8. The method of claim 1 further comprising:
   before causing the second subset of the channel circuit set to receive the incoming EM waves by the circular polarization of the second rotation sense, determining how many channel circuits are included in the second subset of the channel circuit set according to one or more system requirements.

9. The method of claim 8, wherein the one or more system requirements relates to at least one of the following:
   sensitivity of the proximity detection, and
   accuracy of the proximity detection.

10. The method of claim 1 further comprising:
    according to a result of the proximity detection, adjusting transmission power of subsequent wireless communication.

11. The method of claim 10, wherein:
    when adjusting the transmission power of the subsequent wireless communication according to the result of the proximity detection, lowering the transmission power of the subsequent wireless communication if a proximity is detected.

12. The method of claim 1, wherein:
    a certain said radiator in the radiator set comprises a first port and a second port respectively associated with linearly polarized resonances of a first direction and a second direction;
    the first direction and the second direction are not parallel;
    a certain said channel circuit in the first subset of the channel circuit set comprises a radiofrequency (RF) frontend circuit;
    the RF frontend circuit comprises an inbound terminal, a first outbound terminal and a second outbound terminal;
    the first outbound terminal and the second outbound terminal are coupled to the first port and the second port respectively;
    the RF frontend circuit causes a signal at the first outbound terminal and a signal at the inbound terminal to have a first phase shift, and causes a signal at the second outbound terminal and the signal at the inbound terminal to have a second phase shift;
    the first phase shift and the second phase shift are different; and
    when causing the first subset of the channel circuit set to transmit the outgoing EM waves by the circular polarization of the first rotation sense, causing an outgoing signal to be formed at the inbound terminal.

13. The method of claim 12, wherein:
    a second certain said channel circuit in the second subset of the channel circuit set comprises a second RF frontend circuit;
    the second RF frontend circuit comprises a second inbound terminal, a third outbound terminal and a fourth outbound terminal;
    the third outbound terminal and the fourth outbound terminal are coupled to the first port and the second port respectively;
    the second RF frontend circuit causes a signal at the third outbound terminal and a signal at the second inbound terminal to have a third phase shift, and causes a signal at the fourth outbound terminal and the signal at the second inbound terminal to have a fourth phase shift;
    the third phase shift and the fourth phase shift are different; and
    when obtaining the one or more received detection signals, obtaining one of the one or more received detection signals according to the signal at the second inbound terminal.

14. The method of claim 1, wherein:
    a certain said channel circuit in the first subset of the channel circuit set comprises an outbound terminal;
    a certain said radiator in the radiator set comprises a first port and a second port respectively associated with circularly polarized resonances of the first rotation sense and the second rotation sense;

the outbound terminal is coupled to the first port; and when causing the first subset of the channel circuit set to transmit the outgoing EM waves by the circular polarization of the first rotation sense, causing an outgoing signal to be formed at the outbound terminal.

15. The method of claim 14, wherein:

a second certain said channel circuit in the second subset of the channel circuit set comprises a second outbound terminal coupled to the second port; and when obtaining the one or more received detection signals, obtaining one of the one or more received detection signals according to a signal at the second outbound terminal.

16. The method of claim 14, wherein:

the certain said radiator comprises two circular polarization antennas; and the first port and the second port are coupled to the two circular polarization antennas, respectively.

17. The method of claim 1, wherein:

a certain said radiator in the radiator set comprises a first port and a second port respectively associated with linearly polarized resonances of a first direction and a second direction;

the first direction and the second direction are not parallel;

the AiM further comprises a polarizer covering an outward surface of the AiM;

a certain said channel circuit in the first subset of the channel circuit set comprises an outbound terminal coupled to the first port; and when causing the first subset of the channel circuit set to transmit the outgoing EM waves by the circular polarization of the first rotation sense, causing an outgoing signal to be formed at the outbound terminal.

18. The method of claim 17, wherein:

a second certain said channel circuit in the second subset of the channel circuit set comprises a second outbound terminal coupled to the second port; and when obtaining the one or more received detection signals, obtaining one of the one or more received detection signals according to a signal at the second outbound terminal.

19. An antenna-in-module (AiM) of a user equipment (UE) with augmented functionality besides wireless communication; the AiM comprising:

a radiator set comprising one or more radiators; and a channel circuit set comprising one or more channel circuits, each said channel circuit being coupled to an associated said radiator in the radiator set;

wherein the AiM is arranged to:

transmit outgoing electromagnetic (EM) waves by circular polarization of a first rotation sense; and receive incoming EM waves by circular polarization of a second rotation sense, and accordingly obtain one or more received detection signals;

wherein the UE is arranged to execute a proximity detection according to the one or more received detection signals; and the second rotation sense is different from the first rotation sense.

20. The AiM of claim 19 being further arranged to:

receive incoming EM waves by circular polarization of the first rotation sense, and accordingly obtain one or more received communication signals; wherein:

the UE is further arranged to retrieve incoming information of the wireless communication from the one or more received communication signals.

* * * * *